US012608399B2

(12) United States Patent　　　　(10) Patent No.:　US 12,608,399 B2
Vallabhaneni et al.　　　　　　　　(45) Date of Patent:　Apr. 21, 2026

(54) SYSTEMS AND METHODS FOR INTERMITTENT SYNCHRONIZING OF CUSTOMER RELATIONSHIP MANAGEMENT LOCAL APPLICATION CLIENTS

(71) Applicant: Luminix, Inc., Hilo, HI (US)

(72) Inventors: Geetha Vallabhaneni, Volcano, HI (US); Fernando Rodriguez, III, Morrisville, PA (US); Bradford Sparks, Shaker Heights, OH (US)

(73) Assignee: Luminix, Inc., San Jose, CA (US)

( * ) Notice: Subject to any disclaimer, the term of this patent is extended or adjusted under 35 U.S.C. 154(b) by 462 days.

(21) Appl. No.: 17/684,065

(22) Filed: Mar. 1, 2022

(65) Prior Publication Data

US 2022/0179879 A1　　Jun. 9, 2022

Related U.S. Application Data

(60) Continuation-in-part of application No. 17/128,039, filed on Dec. 19, 2020, now Pat. No. 11,475,042, which is a continuation of application No. 16/290,881, filed on Mar. 2, 2019, now Pat. No. 10,909,142, which is a continuation of application No. 15/066,867, filed on Mar. 10, 2016, now Pat. No. 10,268,643, which is a division of application No. 13/898,628, filed on May 21, 2013, now Pat. No. 9,305,073.

(Continued)

(51) Int. Cl.
　　*G06F 16/27*　　　(2019.01)
　　*H04L 67/1095*　　(2022.01)

(52) U.S. Cl.
　　CPC ............ *G06F 16/27* (2019.01); *G06F 16/275* (2019.01); *H04L 67/1095* (2013.01)

(58) Field of Classification Search
　　CPC ........ G06F 16/27; G06F 16/275; G06Q 30/01
　　USPC ......................................................... 707/621
　　See application file for complete search history.

(56) References Cited

U.S. PATENT DOCUMENTS 6,636,897 B1 * 10/2003 Sherman ................. G06F 16/27
　　　　　　　　　　　　　　　　　　　　709/248
7,222,139 B2 * 5/2007 Mau ...................... H04L 41/085
　　　　　　　　　　　　　　　　　　　　707/622

(Continued)

*Primary Examiner* — Hanh B Thai
(74) *Attorney, Agent, or Firm* — Robert H Lee

(57) ABSTRACT

Methods and systems for synchronizing a Customer Relationship Management ("CRM") data system and its mobile application device version. The methods and systems enable both read and write access from the mobile device whether a network connection to the SaaS provider is available or not. They allow for effective local usage and intermittent synching without downloading large numbers of unnecessary records at each synch. The method and systems create a local mobile application device database version to track portions or all of the SaaS provider database. The methods and systems allow the mobile application to be functional while offline between synchs, including with incomplete data and metadata such as a database schema change. In one embodiment, multiple local database tables are used to represent a single SaaS CRM table to facilitate synchronization, and a status indicator is used to convey status on the mobile device application to the mobile user. Administrator settings enable the disclosed synching invention.

20 Claims, 16 Drawing Sheets

Related U.S. Application Data

(60) Provisional application No. 61/651,515, filed on May 24, 2012.

(56)                    References Cited

U.S. PATENT DOCUMENTS

| | | | | |
|---|---|---|---|---|
| 7,739,411 | B2 * | 6/2010 | Messer | H04L 67/1095 |
| | | | | 709/248 |
| 8,229,888 | B1 * | 7/2012 | Roskind | H04N 21/6582 |
| | | | | 707/634 |
| 9,021,448 | B1 * | 4/2015 | Gagliardi | G06F 8/70 |
| | | | | 717/133 |
| 9,141,483 | B1 * | 9/2015 | Sekar | G06F 3/0617 |
| 9,747,288 | B1 * | 8/2017 | Beckford | G06F 16/2365 |
| 10,268,643 | B2 * | 4/2019 | Kraljevic | G06F 16/27 |
| 10,891,282 | B1 * | 1/2021 | Willingham | G06F 21/64 |
| 10,979,500 | B1 * | 4/2021 | Jenks | H04L 51/04 |
| 11,586,593 | B2 * | 2/2023 | Mathurin | G06F 16/1844 |
| 12,254,026 | B1 * | 3/2025 | Sosna | G06F 16/27 |
| 2002/0010798 | A1 * | 1/2002 | Ben-Shaul | H04L 67/1021 |
| | | | | 707/E17.116 |
| 2003/0182327 | A1 * | 9/2003 | Ramanujam | G06F 16/273 |
| 2004/0255048 | A1 * | 12/2004 | Lev Ran | G06F 16/9574 |
| | | | | 709/201 |
| 2005/0216441 | A1 * | 9/2005 | Thomas | G06F 16/275 |
| 2006/0026168 | A1 * | 2/2006 | Bosworth | G06F 16/273 |
| 2006/0117073 | A1 * | 6/2006 | Bosworth | G06F 16/27 |
| 2007/0061487 | A1 * | 3/2007 | Moore | G06F 16/27 |
| | | | | 707/E17.032 |
| 2007/0100967 | A1 * | 5/2007 | Smith | G06F 8/20 |
| | | | | 709/219 |
| 2008/0082579 | A1 * | 4/2008 | Huang | G05B 19/418 |
| 2008/0104133 | A1 * | 5/2008 | Chellappa | G06F 16/275 |
| 2008/0114720 | A1 * | 5/2008 | Smith | G06Q 10/107 |
| 2008/0189439 | A1 * | 8/2008 | Chitre | H04L 67/1095 |
| | | | | 709/248 |
| 2009/0173783 | A1 * | 7/2009 | Fomitchev | G07F 7/1008 |
| | | | | 235/380 |
| 2009/0265261 | A1 * | 10/2009 | Lew | G06Q 40/125 |
| | | | | 705/32 |
| 2010/0030734 | A1 * | 2/2010 | Chunilal | H04W 4/60 |
| | | | | 709/205 |
| 2010/0169392 | A1 * | 7/2010 | Lev Ran | G06F 9/546 |
| | | | | 707/827 |
| 2011/0153413 | A1 * | 6/2011 | Chunilal | G06F 16/3331 |
| | | | | 705/14.42 |
| 2011/0153759 | A1 * | 6/2011 | Rathod | H04L 67/02 |
| | | | | 709/204 |
| 2011/0161349 | A1 * | 6/2011 | Ireland | G06F 16/27 |
| | | | | 707/769 |
| 2011/0218963 | A1 * | 9/2011 | Dun | G06F 16/27 |
| | | | | 707/625 |
| 2012/0173485 | A1 * | 7/2012 | Kothule | G06F 16/275 |
| | | | | 707/634 |
| 2012/0226776 | A1 * | 9/2012 | Keebler | G06F 16/273 |
| | | | | 709/217 |
| 2013/0132463 | A1 * | 5/2013 | Garcia-Ascanio | |
| | | | | H04L 67/1095 |
| | | | | 709/203 |
| 2013/0145349 | A1 * | 6/2013 | Basak | G06F 11/3495 |
| | | | | 717/121 |
| 2013/0152064 | A1 * | 6/2013 | Gagliardi | G06F 9/44521 |
| | | | | 717/166 |
| 2014/0280314 | A1 * | 9/2014 | Coleman | G06F 16/21 |
| | | | | 707/769 |
| 2015/0100546 | A1 * | 4/2015 | Eberlein | G06F 16/1787 |
| | | | | 707/610 |
| 2015/0331957 | A1 * | 11/2015 | Elgebeely | G06F 16/9538 |
| | | | | 707/634 |
| 2015/0363481 | A1 * | 12/2015 | Haynes | G06Q 10/10 |
| | | | | 707/748 |
| 2015/0379037 | A1 * | 12/2015 | Pimprikar | G06F 16/178 |
| | | | | 707/610 |
| 2018/0144039 | A1 * | 5/2018 | Hawa | G06F 40/197 |
| 2018/0349408 | A1 * | 12/2018 | Jewell | G06F 16/172 |
| 2019/0171669 | A1 * | 6/2019 | Patankar | G01M 17/00 |
| 2020/0125582 | A1 * | 4/2020 | O'Shaughnessy | G06F 16/245 |
| 2020/0380013 | A1 * | 12/2020 | Mahbod | G06F 12/0871 |
| 2022/0156238 | A1 * | 5/2022 | Kunzle | G06F 16/1815 |
| 2024/0378215 | A1 * | 11/2024 | Gonyea | G06F 16/2343 |

* cited by examiner

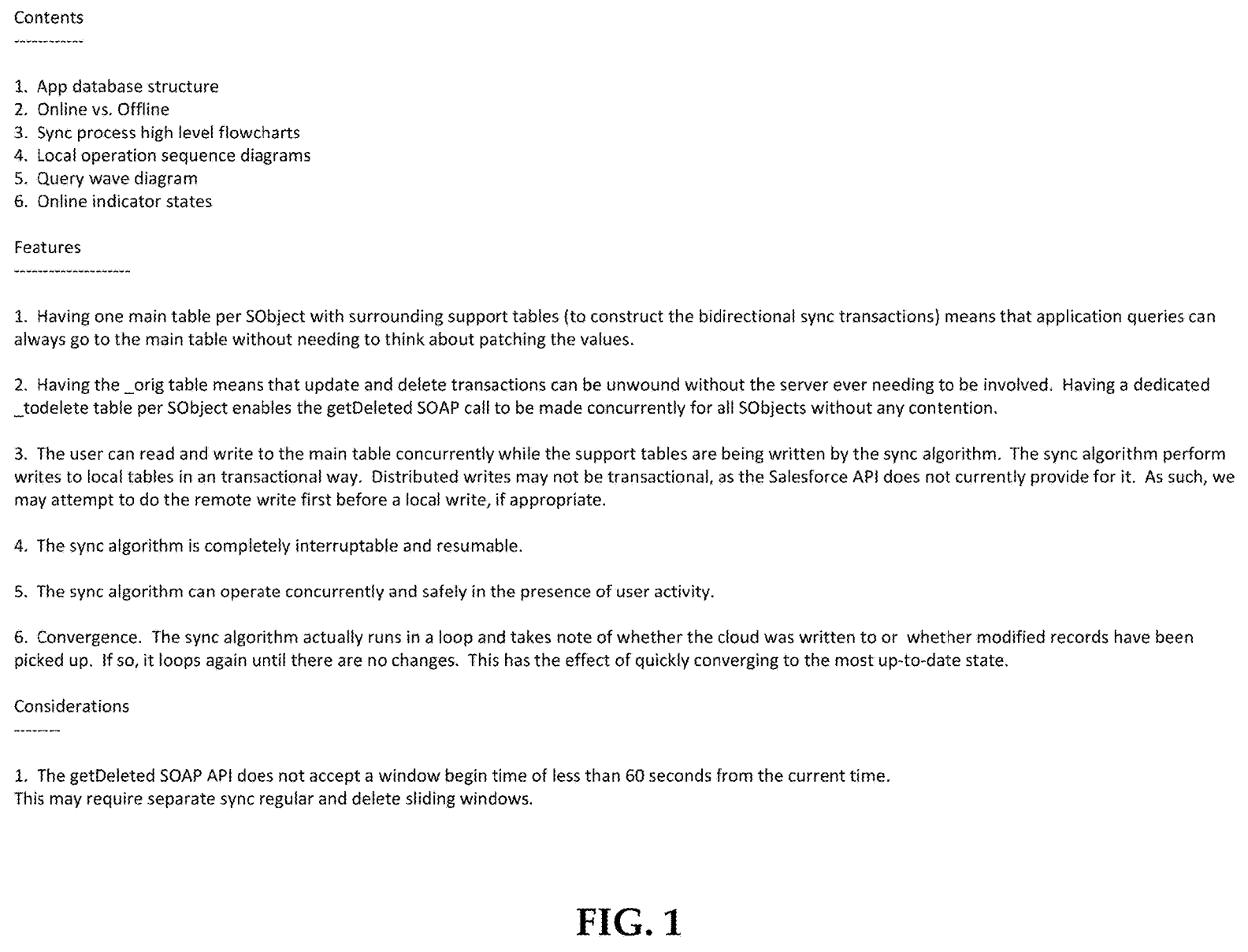

Contents
—————

1. App database structure
2. Online vs. Offline
3. Sync process high level flowcharts
4. Local operation sequence diagrams
5. Query wave diagram
6. Online indicator states Features
————————

1. Having one main table per SObject with surrounding support tables (to construct the bidirectional sync transactions) means that application queries can always go to the main table without needing to think about patching the values.

2. Having the _orig table means that update and delete transactions can be unwound without the server ever needing to be involved. Having a dedicated _todelete table per SObject enables the getDeleted SOAP call to be made concurrently for all SObjects without any contention.

3. The user can read and write to the main table concurrently while the support tables are being written by the sync algorithm. The sync algorithm perform writes to local tables in an transactional way. Distributed writes may not be transactional, as the Salesforce API does not currently provide for it. As such, we may attempt to do the remote write first before a local write, if appropriate.

4. The sync algorithm is completely interruptable and resumable.

5. The sync algorithm can operate concurrently and safely in the presence of user activity.

6. Convergence. The sync algorithm actually runs in a loop and takes note of whether the cloud was written to or whether modified records have been picked up. If so, it loops again until there are no changes. This has the effect of quickly converging to the most up-to-date state.

Considerations
————

1. The getDeleted SOAP API does not accept a window begin time of less than 60 seconds from the current time. This may require separate sync regular and delete sliding windows.

FIG. 1

Figure 3:
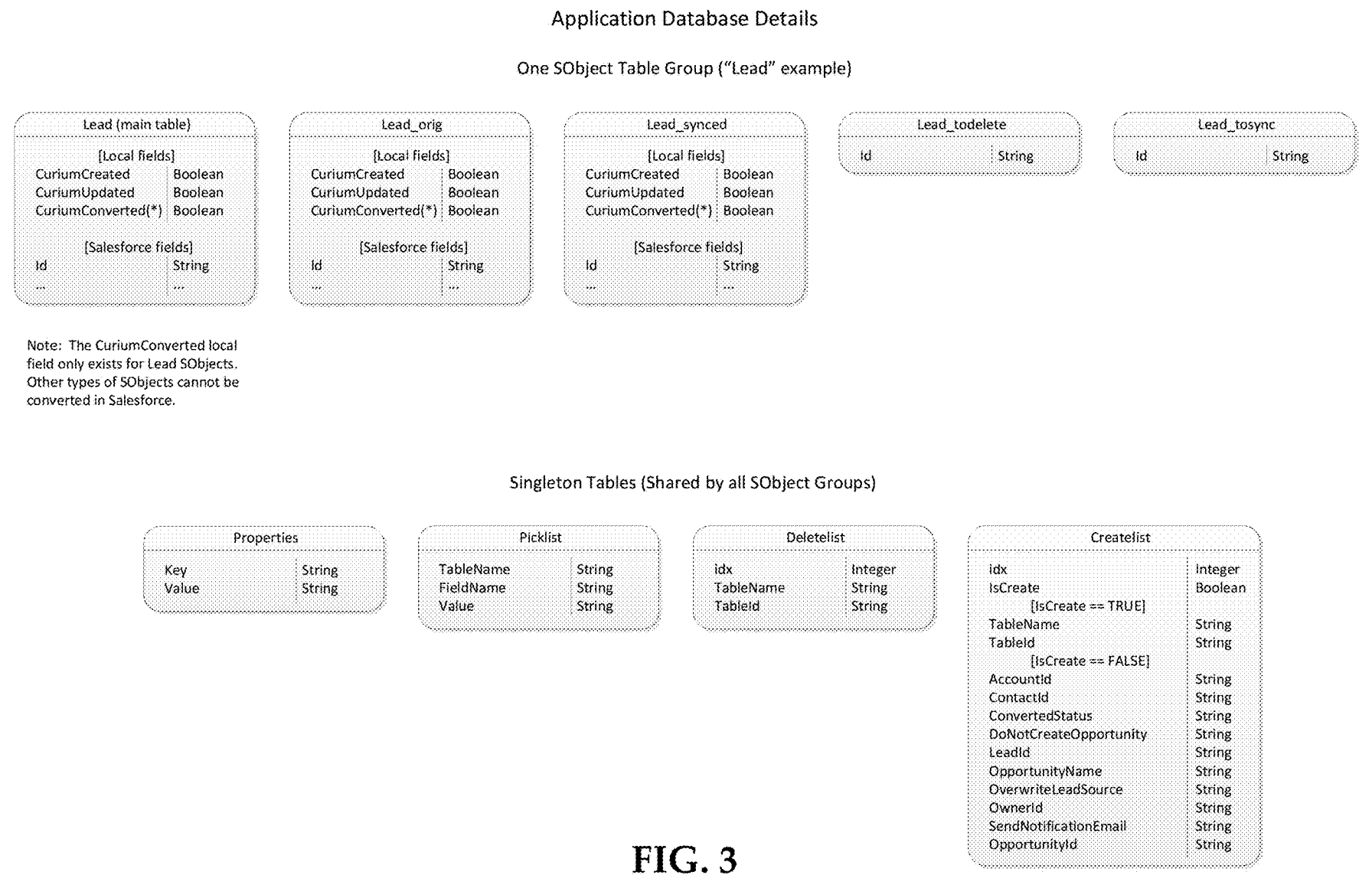

Application Database Details

One SObject Table Group ("Lead" example)

Lead (main table)

| [Local fields] | |
|---|---|
| CuriumCreated | Boolean |
| CuriumUpdated | Boolean |
| CuriumConverted(*) | Boolean |
| [Salesforce fields] | |
| Id | String |
| ... | ... |

Lead_orig

| [Local fields] | |
|---|---|
| CuriumCreated | Boolean |
| CuriumUpdated | Boolean |
| CuriumConverted(*) | Boolean |
| [Salesforce fields] | |
| Id | String |
| ... | ... |

Lead_synced

| [Local fields] | |
|---|---|
| CuriumCreated | Boolean |
| CuriumUpdated | Boolean |
| CuriumConverted(*) | Boolean |
| [Salesforce fields] | |
| Id | String |
| ... | ... |

Lead_todelete

| | |
|---|---|
| Id | String |

Lead_tosync

| | |
|---|---|
| Id | String |

Note: The CuriumConverted local field only exists for Lead SObjects. Other types of SObjects cannot be converted in Salesforce.

Singleton Tables (Shared by all SObject Groups)

Properties

| | |
|---|---|
| Key | String |
| Value | String |

Picklist

| | |
|---|---|
| TableName | String |
| FieldName | String |
| Value | String |

Deletelist

| | |
|---|---|
| idx | Integer |
| TableName | String |
| TableId | String |

Createlist

| | |
|---|---|
| idx | Integer |
| IsCreate | Boolean |
| [IsCreate == TRUE] | |
| TableName | String |
| TableId | String |
| [IsCreate == FALSE] | |
| AccountId | String |
| ContactId | String |
| ConvertedStatus | String |
| DoNotCreateOpportunity | String |
| LeadId | String |
| OpportunityName | String |
| OverwriteLeadSource | String |
| OwnerId | String |
| SendNotificationEmail | String |
| OpportunityId | String |

Offline Mode Local Create

Offline Mode Local Delete

1300

1400

Successive Sync Generations

1401 Generation n-1

1403 Generation n

A    B    C

1405 Records to Delete    1407 Records to Update    1409 New Records

A    1405 Records from the previous Generation (n-1) tp delete (records that are no longer part of the object)

B    1407 Records from the previous Generation (n-1) to update

C    1409 New Records in this Generation (1) to insert

SYSTEMS AND METHODS FOR INTERMITTENT SYNCHRONIZING OF CUSTOMER RELATIONSHIP MANAGEMENT LOCAL APPLICATION CLIENTS

APPLICATION PRIORITY DATA

This Application is a Continuation-In-Part Application of patent application Ser. No. 17/128,039 filed Dec. 19, 2020, by inventors Kraljevic, Vallabhaneni, and Rodriguez III, which is a Continuation Application of Ser. No. 16/290,881 by inventors Kraljevic, Vallabhaneni, and Rodriguez III, filed Mar. 2, 2019, which is a Continuation Application of patent application Ser. No. 15/066,867 by inventors Kraljevic, Vallabhaneni, and Rodriguez III, filed Mar. 10, 2016, which is a Divisional Application of patent application Ser. No. 13/898,628 by inventors Kraljevic, Vallabhaneni, and Rodriguez III, filed May 21, 2013, which in turn claims the priority benefit of Provisional Application No. 61/651,515 entitled "Systems and Methods for Facilitating Communications Among Sales Employees," filed May 24, 2012. All such references are incorporated herein by reference in their entirety for all purposes.

FIELD OF THE INVENTION

The present invention relates generally to the use of customer relationship management systems, and more specifically, but not by way of limitation, to systems and methods for facilitating communications among customer relationship management users, and in some instances to the bidirectional synchronization of customer relationship management ("CRM") systems and mobile devices. The invention also relates to methods and systems with regard to user/administrative settings of CRM applications to facilitate offline mobile client use of CRM systems and synchronization of server applications with such mobile client versions when communication is available/restored.

BACKGROUND

Both mobile computing and software services in the cloud have become very popular in the past decade. Customer relationship management systems, such as the SalesForce software as service ("SaaS"), in particular, have continued to grow in popularity, although asynchronous (e.g., offline) interactions between these systems and mobile devices have yet to be optimized.

BRIEF DESCRIPTION OF THE DRAWINGS

FIG. 1 is a summary of various aspects of the present technology.

FIG. 3 illustrates various tables of an exemplary application database.

FIG. 7 illustrates an exemplary offline method for creating and utilizing a local client database.

DETAILED DESCRIPTION OF EXEMPLARY EMBODIMENTS

Figure 2:
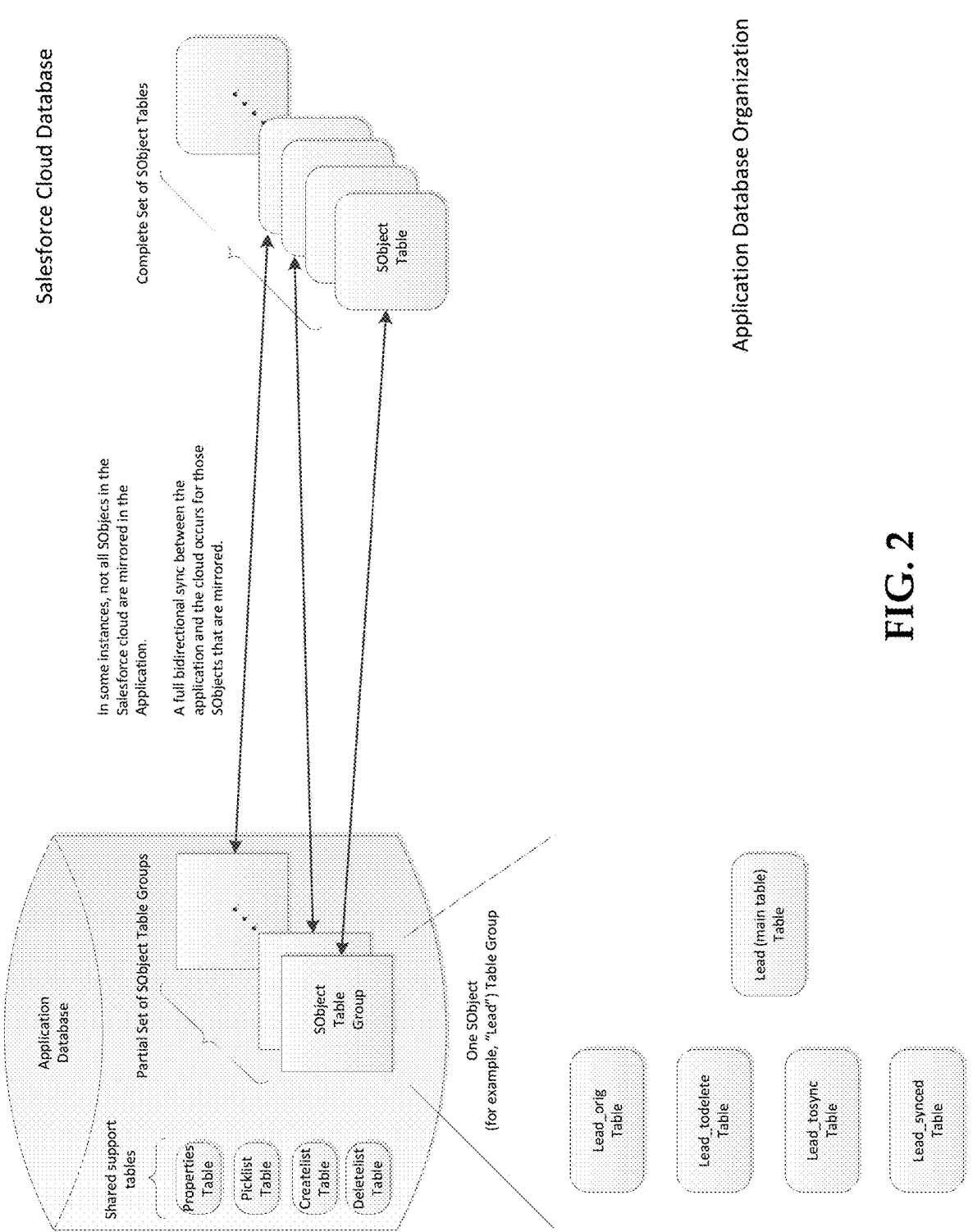
FIG. 2 illustrates bidirectional synchronization between a CRM system and an application database that resides on a mobile device.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Referring now to the collective drawings, FIGS. 1-16, which depict various aspects of bidirectional synchronization between CRM systems and mobile devices. Generally described, the present technology allows a client (e.g., mobile device) to interact with a customer relationship management system, such as the SalesForce SaaS to maintain a coherent data copy that provides high availability to the user. The present technology allows for application data synchronicity even in the presence of network loss or failure, and syncs with the cloud master copy, for SalesForce applications including SalesForce Field Service (also known as Field Service Lightning) as well as other CRM and non-CRM applications.

Application Database Organization

As background, a customer relationship management ("CRM") system cloud deployment may consist of an RDBMS-like set of tables (otherwise known as entities). Individual CRM systems may have a specific terminology for this generic idea; for example, SalesForce terminology for a table within the CRM platform is an SObject, hereinafter referred to as an "SObject" (singular) or "SObjects" (plural), also called Salesforce objects. A constituent part of designing a client application that bidirectionally interacts (e.g., Synchronizes) with the CRM system involves establishing a scheme for representing these SObjects locally in the client application, and determining how information between the cloud SObjects and the locally stored SObjects is kept coherent (e.g., "Synchronized" or "Synced"). Algorithms responsible for maintaining this coherence will be referred to as the "Synchronization" ("Sync") algorithm.

FIG. 2 illustrates an overall approach that may involve any of: (a) using a client local SQL database (such as SQLite) with a set of tables to model each SObject (called an SObject Table group). The present technology may also employ a set of shared singleton support tables and SQL transactions to safely support concurrent user accesses with the Synchronization algorithm, as well as a Synchronization algorithm to manage the data exchange between the client and server.

Note that in some instances not all server-side tables are necessarily cloned on the client. The Salesforce.com environment has dozens of tables, and a purpose-built client application is unlikely to require all of them, although in some instances the present technology may utilize all server-side tables of the CRM system.

Application Database Details

FIG. 3 includes a description and diagram of shared support tables utilized by the present technology. The Property table contains a set of key/value pair properties. The Picklist table contains information from the SObject schema about multiple-choice picklist values for a field. The Createlist table (organized and utilized as a first in first out "FIFO") contains a queue of entries representing local create or convertLead operations. The entry with the lowest idx may be placed at the head of the queue. Entries may be enqueued at the tail and dequeued from the head. The FIFO nature of the Createlist is important because objects in the list may refer to senior objects ahead in the list. If they are not created on the cloud server (e.g., in the correct order, the server may reject the Synchronization transaction.

Each Createlist row contains the following fields: (i) idx—queue ordering index; (ii) IsCreate—"TRUE" if the entry represents a create; "FALSE" if the entry represents a convertLead. For the create case: (iii) TableName—Table that the entry was created in; (iv) TableId—The tmpId assigned locally which needs to be replaced with a value assigned by the server.

For the convertLead case, the following fields correspond to the arguments to the Salesforce SOAP API convert-Lead( ). Note that the Account, Contact, and Lead Id fields may be either real server-assigned values, or a tmpId locally-assigned value if there is a create operation corresponding to that Id ahead of the convert in the Createlist. The Opportunity Id in the Createlist may be either a tmpId or empty (if DoNotCreateOpportunity is "TRUE"). When created objects return from the server, tmpId's may be swapped with real server Id's such that any subsequent entries in the Createlist (as well as all other references in all other tables) may be corrected.

Additional SObjects include, but are not limited to, AccountId; ContactId; ConvertedStatus; DoNotCreateOpportunity; LeadId; OpportunityName; OverwriteLead-Source; OwnerId; and SendNotificationEmail.

OpportunityId—The tmpId may be assigned locally and may need to be replaced with a value assigned by the server. The Deletelist contains the set of entries that have been deleted locally. Note that the Createlist and Deletelist may be empty at the end of a successfully completed Sync.

Next we describe each of the tables in an SObject Table Group. <SObject>—The "main table" containing both locally changed and unchanged data entries. Conceptually, this is convenient, because the application may need only look at one table to get its latest data. Special fields (all boolean): CuriumCreated—This entry was locally create;

CuriumUpdated—This entry was locally updated; CuriumConverted—(Lead only) This entry was locally converted.

<SObject>_todelete—A list of Ids of objects deleted by the server since the last sync. <SObject>_tosync—[Not typically needed]. A list of IDs of extra objects to fetch from the server. <SObject>_synced—The actual modified objects fetched from the server. <SObject>_orig—A backup of the original unchanged object is made when an object is locally updated or deleted. This is to assist future resolves (with the corresponding server object) or undo the change.

The present technology may utilize the prefix "Curium" or any other arbitrary prefix that does not conflict with naming conventions of the CRM system as a way of distinguishing local-only bookkeeping fields.

The main, _orig, and _synced tables for each SObject contain the entire set of fields that the cloud SObject table contains. Of these, the "Id" field is interesting because it may be used to uniquely identify object instances and correlate instances between the client and server.

Online Vs. Offline Modes

Figure 4:
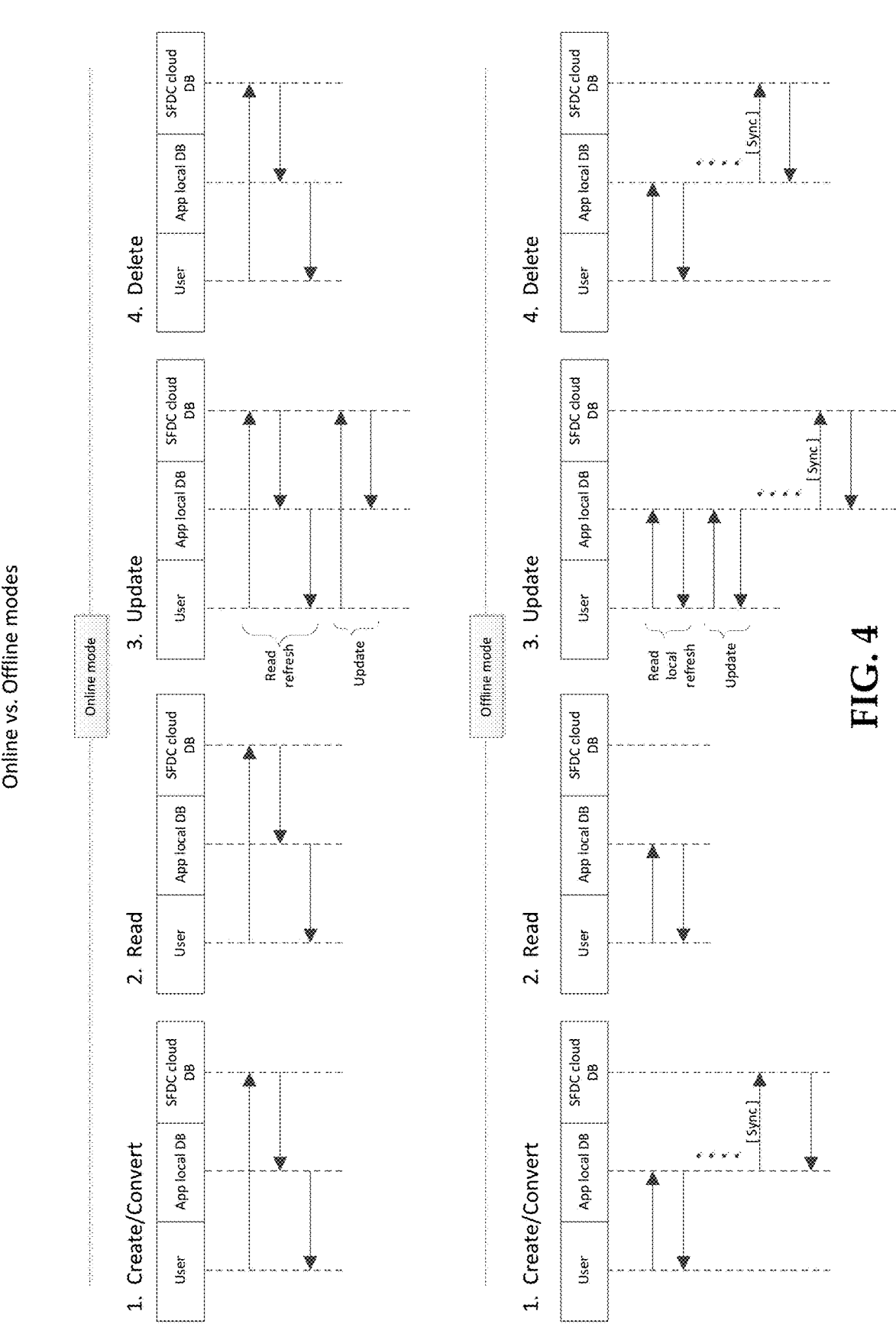
FIG. 4 illustrates various data flow diagrams for various actions between the CRM system and the mobile device that are performed either online or offline.

The present technology may support both online and offline modes [see FIG. 4]. Online mode is straightforward and the interaction between remote and local objects is depicted in FIG. 4. Note that for online cases, the remote object may be accessed first, and the local object may be updated to keep the local database as current as possible.

Also note that for the online update case, in order to reduce the probability of a field client and server update collision, the object value may be refreshed immediately upon entering the update flow. This ensures the client has the most up to date copy of the server value possible before attempting the edit.

With regard to offline mode, accesses for the user may be satisfied locally, and writes (e.g., application data) may be stored locally and posted to the cloud server during a (future) Synchronization pass.

The following description considers various techniques for implementing a state-of-the-art offline mode. A useful performance-enhancing hybrid mode is an offline-read plus an online-write mode. This is equivalent to the behavior of a write-through cache, where reads are satisfied locally (and are, hence, fast). Moreover writes of application data may go directly to the server (specifically to the customer database of the CRM system) such that the server has the most up-to-date information possible, and the client may not be required to carry un-synced changes. This mode works especially well when most accesses are reads and the user is willing to manually initiate a sync when the most up-to-date server data is needed.

Synchronization Algorithm

Figure 5:
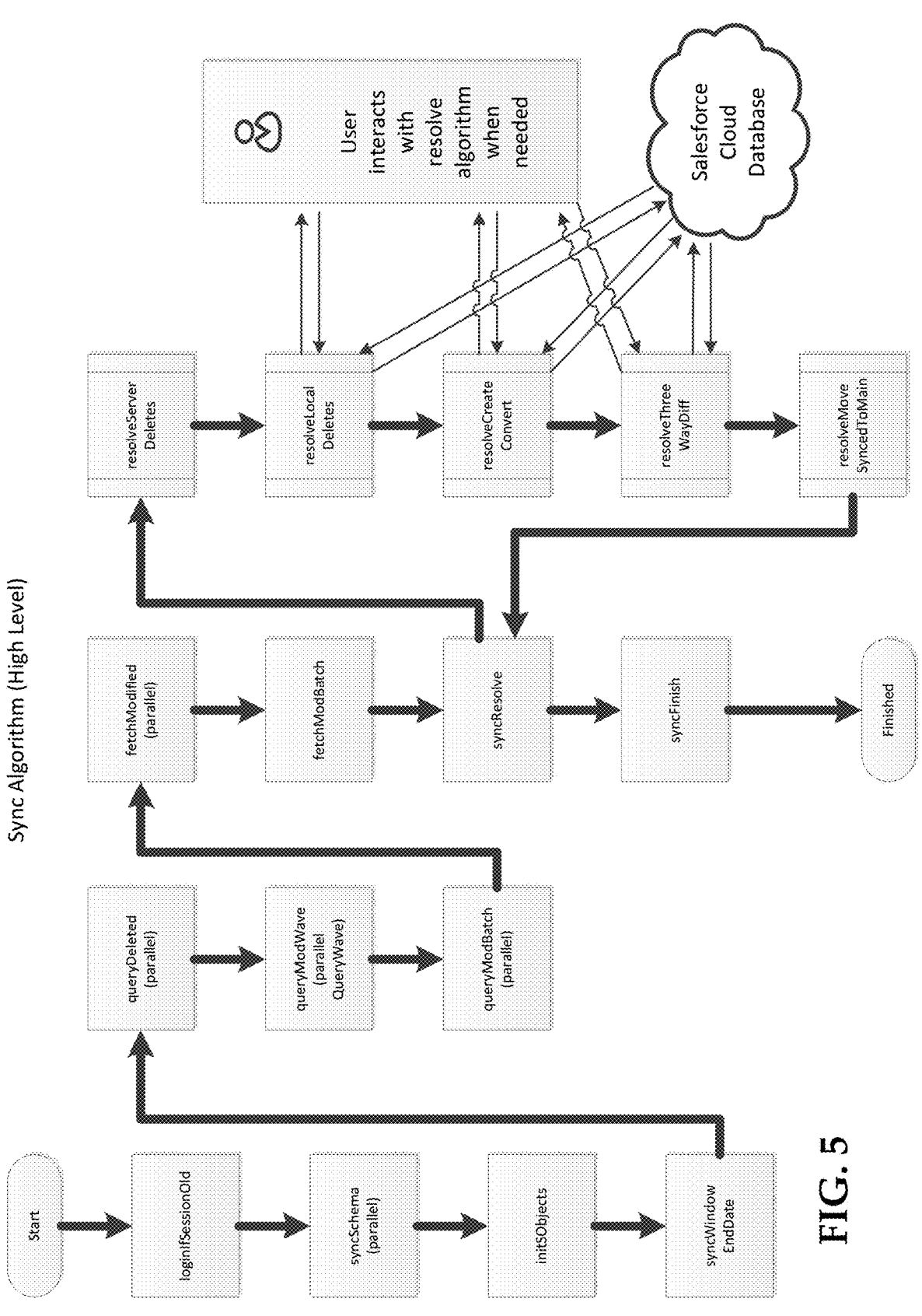
FIG. 5 illustrates an overview of an exemplary method for bidirectionally synchronizing a customer database and a local client database.

FIG. 5 illustrates the operation of a Synchronization algorithm that may be responsible for maintaining coherence between the local and cloud databases. The sync algorithm is made safely interruptible and re-startable by storing the current state and progress within that state as properties in the property table.

A Sync process may begin by attempting at get a new Salesforce sessionId if needed (loginIfSessionOld). This attempts to prevent failure of the Sync operation due to an expired session.

The next stage reads the SObject schema. Schema information is stored to the property table to permit offline access, as well as to enable change detection for the cloud schema. In the event of a cloud schema change, the client must perform SQL commands to affect an equivalent change locally to the main, _orig, and _synced tables in the SObject table group. Schema for all SObjects may be queried in parallel. (Salesforce APIs used: REST GET SObject describe.)

The initSObjects stage reads the saved schema information from the property table so the Sync algorithm has access to the field information for each SObject.

The syncWindowEndDate stage calculates the time window for performing the main Sync, as well as a secondary time window for syncing server-side deletes. Unfortunately, due to limitations in the SalesForce getDeleted API, it may not be possible to maintain a single window. This stage uses the end date and time of the previously completed sync as the beginning date and time for the current sync. The end time for the current sync is determined by asking the SalesForce cloud server for its current time. In order to keep things as consistent as possible, the sync algorithm uses the same start and end time for all SObjects. (Salesforce APIs used: SOAP getServerTime.).

The queryDeleted stage queries the server for any deleted object Ids for a given SObject within the calculated time range. Any IDs are stored in the _todelete table. Server SObject tables can be queried in parallel and having a per-SObject _todelete table makes it easy to avoid collisions when storing the results of the concurrent getDeleted( ) queries. (Salesforce APIs used: SOAP getDeleted.)

The queryModWave stage queries the cloud for records created or modified within the sync time window. SObject schema information is used to query all fields of each SObject, or at least a portion thereof. SObjects may be queried in parallel, and the results of the query are stored in the _synced table. The Query Wave concept is described in detail in a later section, with reference to FIG. 11. As a special optimization, to give the application a feeling of immediate usability the first ever time a sync is performed, the first ever sync may safely store results for this stage directly into the main table since it's known that no resolve will need to be performed. (Salesforce APIs used: REST SOQL query.)

The queryModBatch stage may not typically be used. If any data is specifically desired to be fetched by the Bulk API, queries for those requests may be issued here. The fetchModified stage may also not typically be used. If any rows in any of the _tofetch tables are populated, they are read here and stored in their corresponding _synced tables. Generally, there is nothing to do here because the query-ModWave stage may read all the created and modified objects itself, as will be described in greater detail below.

Additionally, the fetchModBatch stage may not typically be used. If any batch queries were issued in the queryMod-Batch stage, the results may be read back here and written to the appropriate _synced table depending on the SObject.

The syncResolve stage walks through the full set of detailed resolve stages (see below). The syncFinish stage cleans up any final sync property values and returns the application to a state of sync not in progress.

Resolve Stages

The resolveServerDeletes stage applies all server-initiated deletes by iterating through the entries in all _todelete tables. Any other table row with an Id value of the deleted object is also deleted.

The resolveLocalDeletes stage applies all locally-initiated deletes from the Deletelist table. In the event that the server rejects the delete operation, the user may be presented with a dialogue asking if he wishes to abandon the change. Doing so simply involves moving the _orig entry for the deleted item back to the main table and deleting the corresponding Deletelist entry. (Salesforce APIs used: REST DELETE query.)

The resolveCreateConvert stage applies all locally-initiated create and convertLead operations. These are stored in the Createlist FIFO. In the event that the server rejects the create or convert operation, the user may be presented with a dialogue asking if he wishes to abandon the change. Alternately, if there is some data validation problem, the user may instead edit a field in the failing object and reattempt the operation. (Salesforce APIs used: REST POST query.)

The resolveThreeWayDiff stage does a three-way-diff between the main, _orig and _synced tables. Entries that have changed on the server get written locally and vice-versa. In the case that a field has changed on both the client and server, the user is prompted to select a winner. Other server rejections of the transaction may result in the user abandoning or editing and retrying, as for the create case. (Salesforce APIs used: REST PATCH query.)

The resolveMoveSyncedToMain stage moves the remaining _synced table entries into their respective main tables.

At the end of a successful complete run of the sync algorithm, assuming there has not been any additional work performed by the user while the sync is running, the SObject main tables will contain all of the object information, and this information will be up to date with the server. All of the other tables in the SObject Table Group (_orig, _sync-ed, _todelete, _tosync) will be empty, and the Createlist and Deletelist shared support tables will be empty.

Note that if the ServerWrittenThisSyncIteration property is set at any point during the iteration, or the query/fetch stages pull new or modified records from the server, the entire sync algorithm is repeated. This provides a converging effect to ensure that when the sync is done the client and server are as up to date as possible.

Sync Algorithm (Typical)

Figure 6:
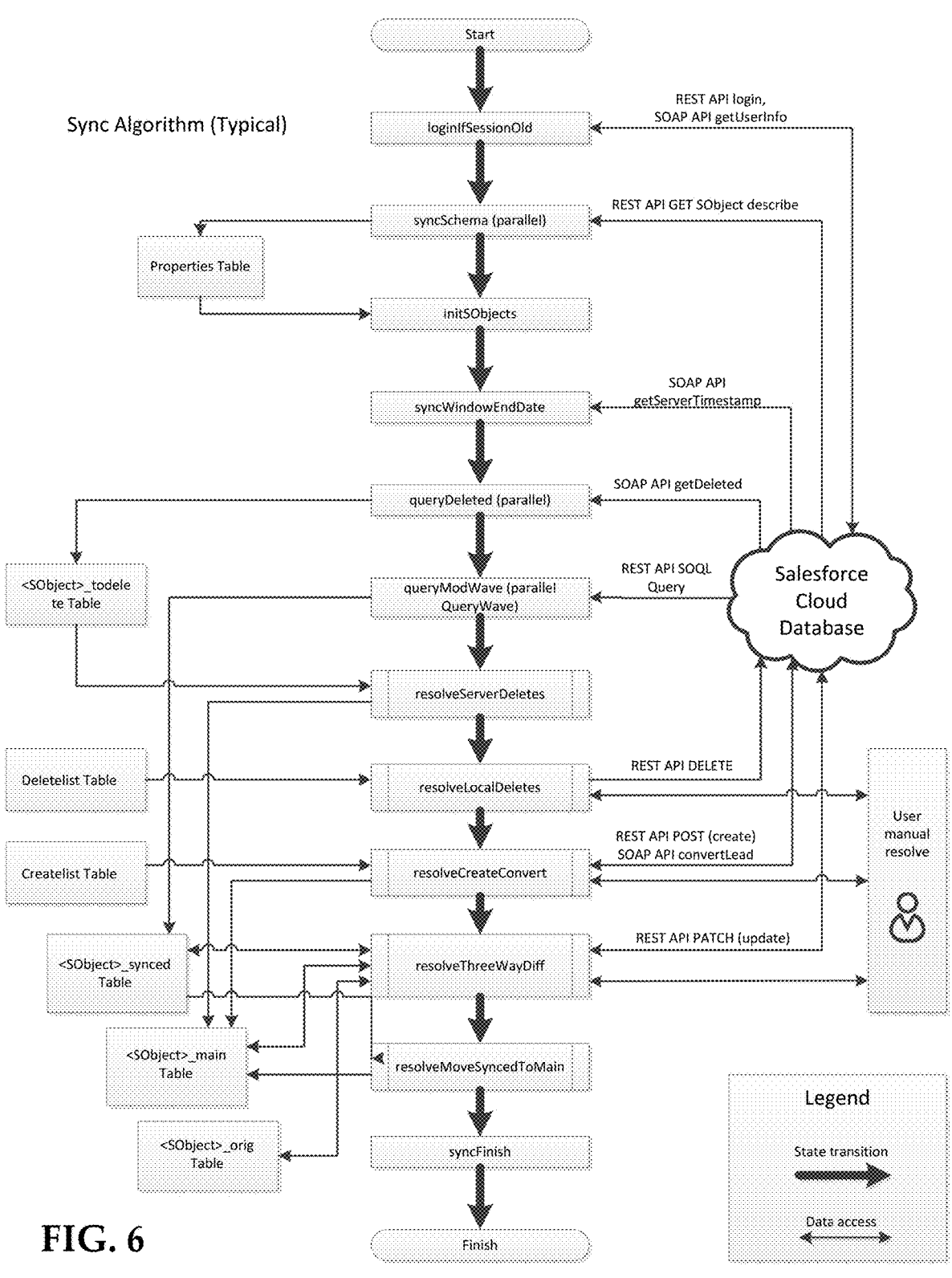
FIG. 6 illustrates a detailed view of the exemplary method of FIG. 5.

FIG. 6 illustrates a typical operation of the sync algorithm and shows in more detail the interaction between the algorithm, some of the local tables, the Salesforce cloud, and the user (as described in the previous section).

Offline Mode Local Transactions

One of the key properties of the SObject Table technique is that the main table may in some instances be made available to the application for user interaction via various actions, some of which will be described in greater detail below.

Create

Figure 7:
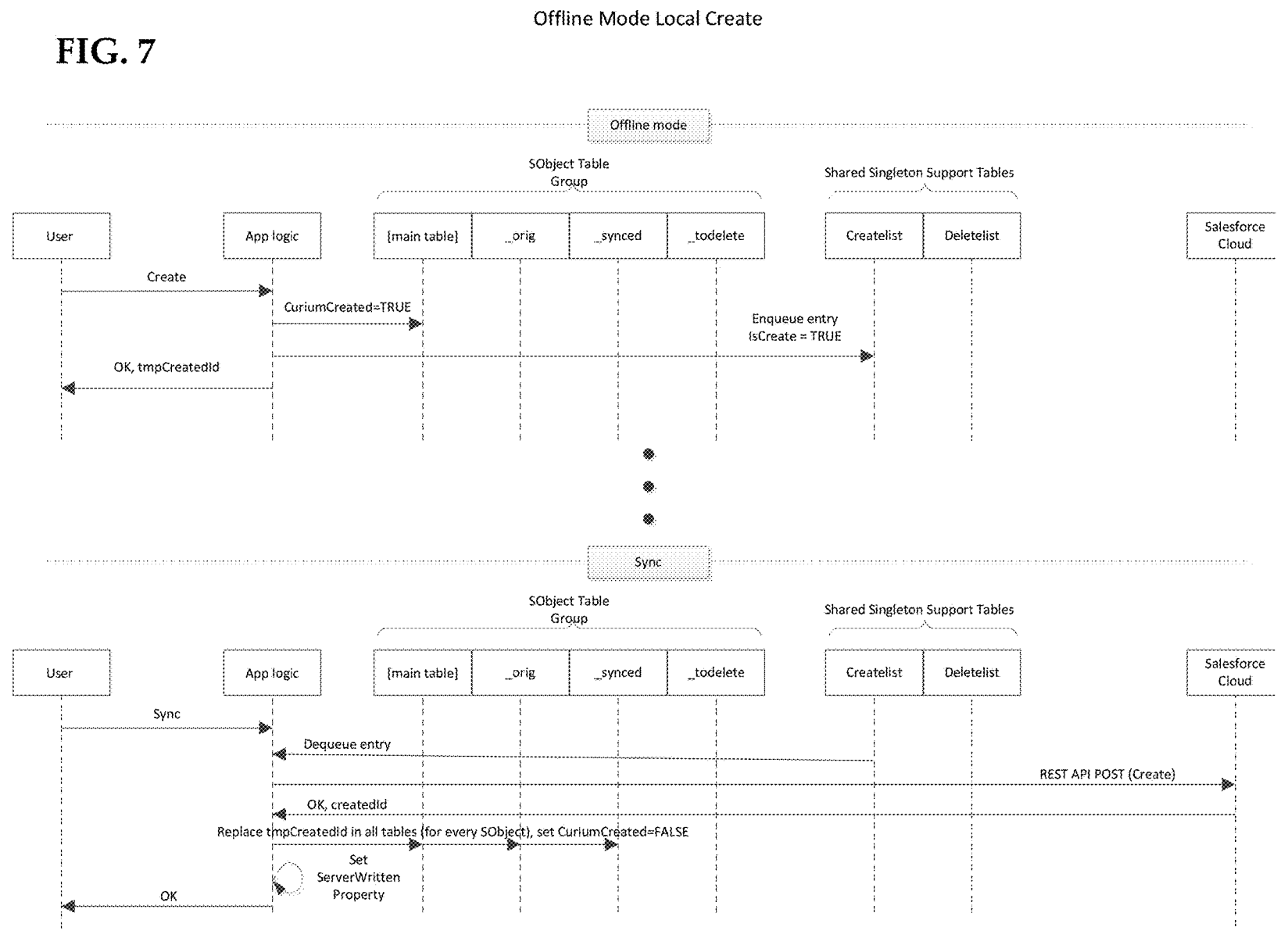

FIG. 7 illustrates a create case where the application creates a unique tmpId, which the application will use temporarily. The application may then swap the tmpId with a real Id when the create operation is posted to the cloud. Then an entry in the SObject main table is created (with CuriumCreated=TRUE) and a Createlist entry is enqueued (with IsCreate=TRUE).

At sync time, the Createlist may be dequeued and the Salesforce REST API POST (create) may be called to get a real ID. This real ID needs to be swapped for the tmpId in all places, or at least a portion thereof. Finally, the Server-WrittenThisSyncIteration property is set to indicate that another iteration of the sync algorithm should take place. This will fetch back the fully formed entry just created on the server since the newly created server-side object's Last-ModifiedDate will be later than the end window timestamp of the current sync iteration. We want the server's full copy because some fields may be calculated, and we don't want to reengineer that work on the client side.

Abandoning a create action simply involves deleting the main table entry and deleting the associated Createlist entry.

Update

Figure 8:
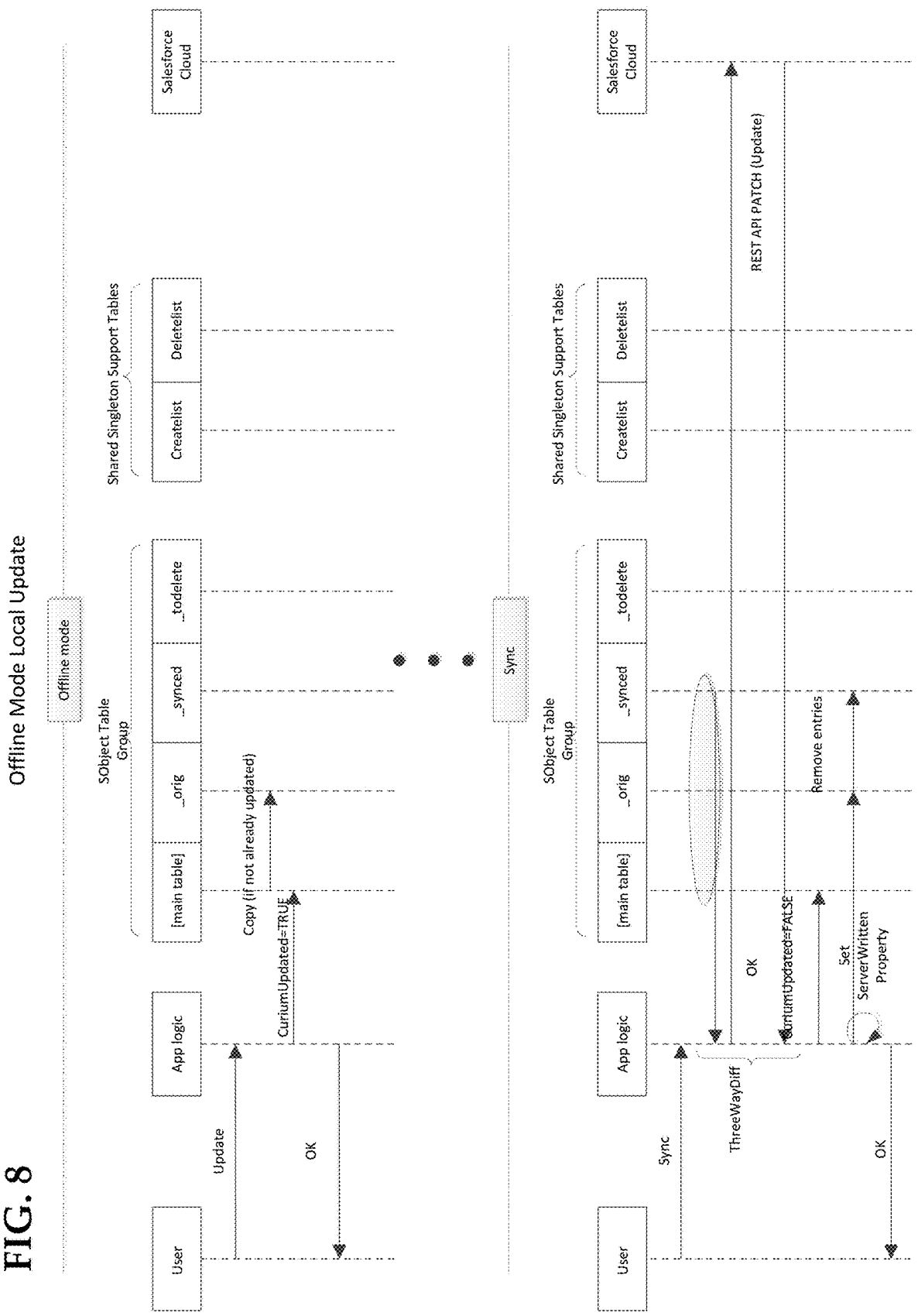
FIG. 8 illustrates an exemplary offline method for updating objects on a local client database.

FIG. 8 illustrates an update case for the application. The first time an untouched SObject row is updated, the application makes a copy of the row in the _orig table. This enables both unwinding of the update as well as enabling the three-way-diff to determine which fields need to be written to the server. In addition, the CuriumUpdated field in the main table object is set to TRUE, so we can now recognize this object as being dirty.

At sync time, the main table, _orig table, and _synced table are compared for this object (correlated by Id). If there is no _synced table entry then this object has not been touched on the server side since the last sync, and the main table object is written to the server. If there is a _synced table entry, then the _orig table is compared to determine whether the field was modified locally or on the server. In the case where both a local and a server modification was made to the same field, the user may be prompted to settle a winner or choose a new value entirely. After doing this three-way compare, the appropriate fields are written to the server (with a Salesforce REST API PATCH (create) call) and the local copies of the object such that they are the same. At this point, the _orig and _tosync table entries (if existing) are deleted and the CuriumUpdated value in the main table should be set to FALSE (since the value now tracks the server value).

Finally, the ServerWrittenThisSyncIteration property is set to indicate another iteration of the sync algorithm should take place. This will fetch back the fully formed entry just written on the server since the server-side object's Last-ModifiedDate will be later than the end window timestamp of the current sync iteration. Abandoning an update just requires moving the _orig entry back to the main table.

Delete

Figure 9:
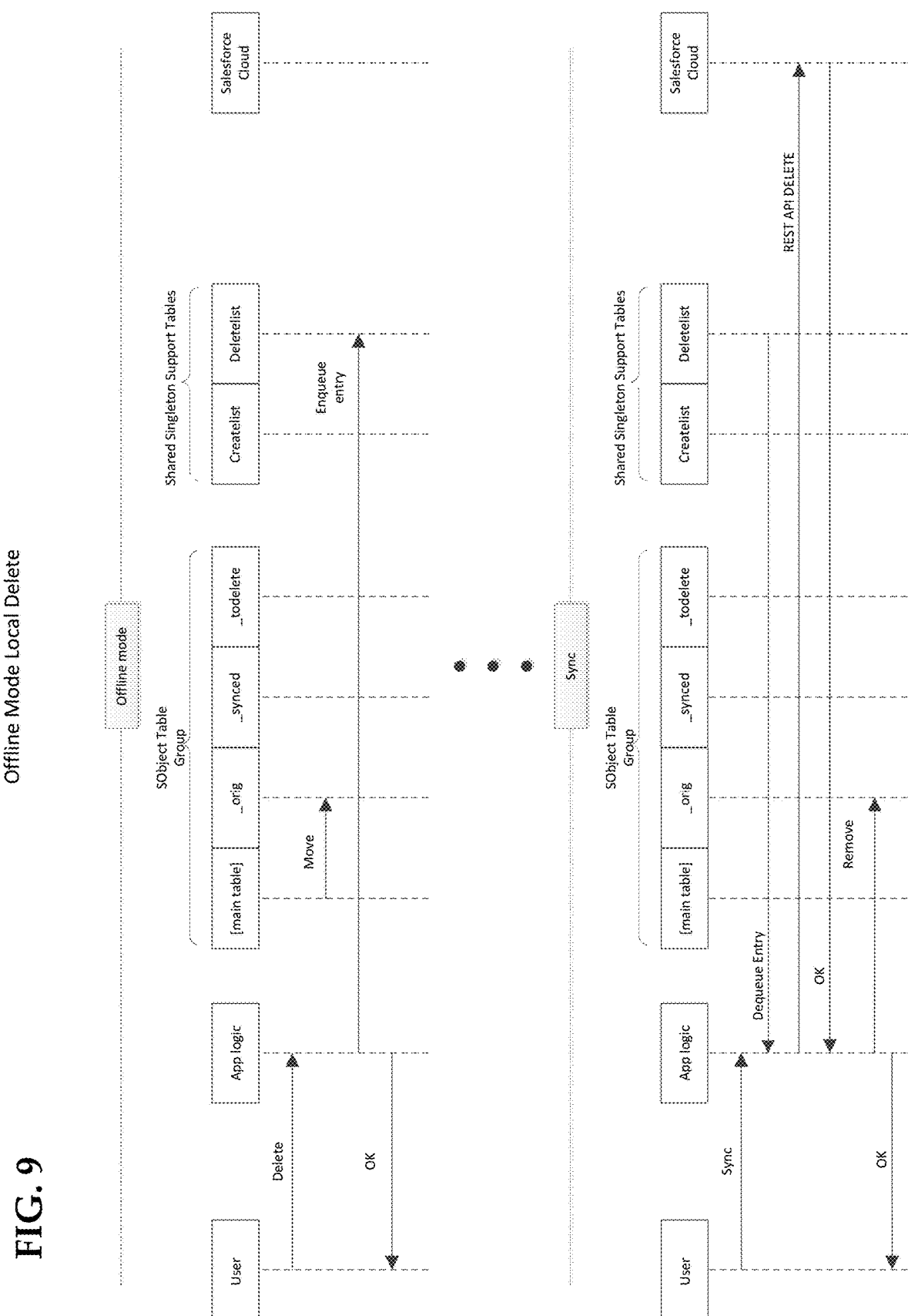
FIG. 9 illustrates an exemplary offline method for deleting objects on a local client database.

FIG. 9 illustrates the operation of a locally-initiated delete case where we move the main table entry into the _orig table and create a Deletelist entry. At Sync time, the Deletelist is dequeued, and the Salesforce REST API DELETE method is called with the proper Id. Finally, the local _orig object is deleted. Abandoning a delete only requires moving the _orig entry back to the main table and dropping the Deletelist entry.

Convert

Figure 10:
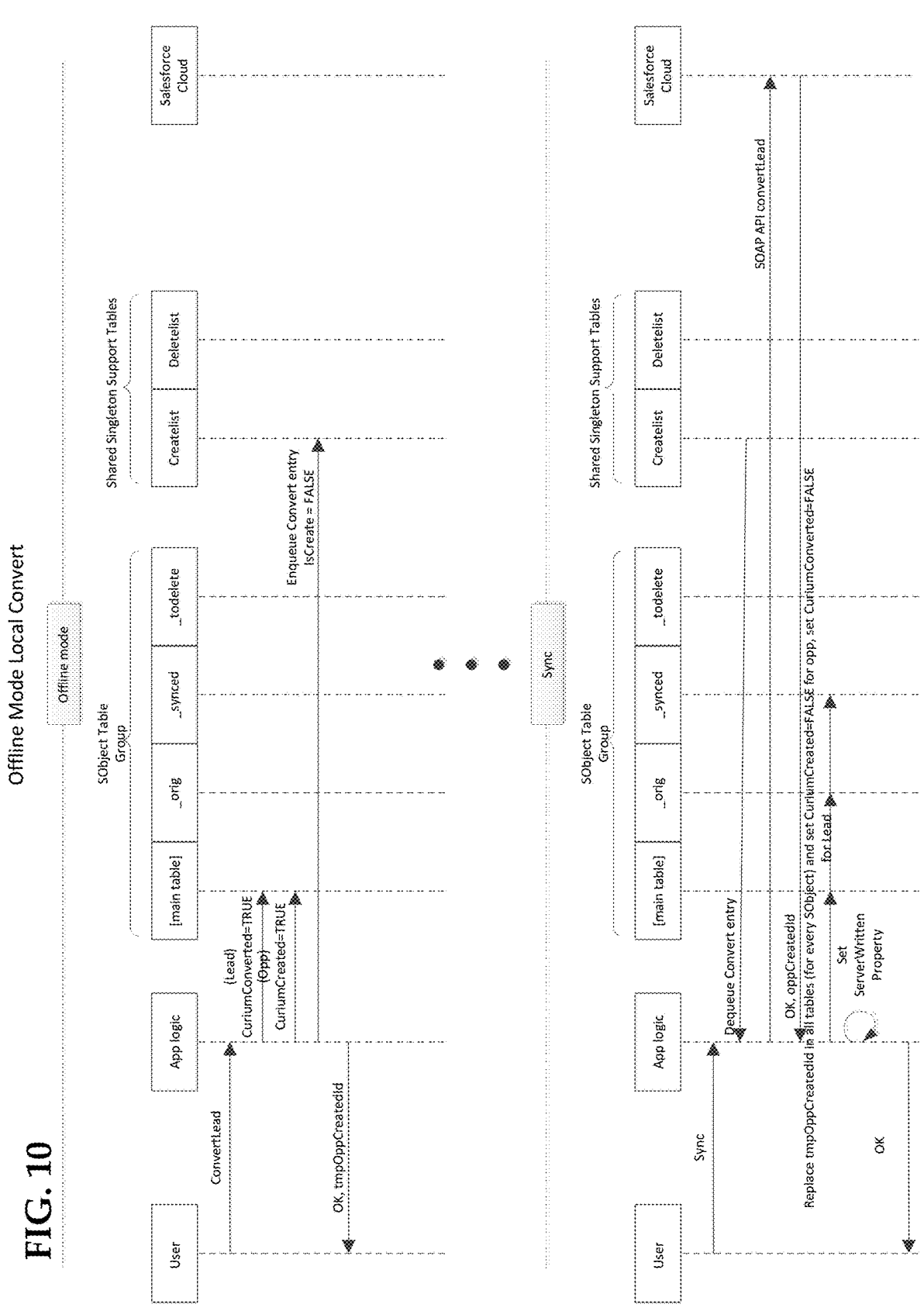
FIG. 10 illustrates an exemplary offline method for converting at least a portion of a local client database.

FIG. 10 illustrates the operation of a convertLead (or convert for short) operation, which may be very similar to create in many respects, since the result of a convert can optionally create an Opportunity SObject record. The first step in a convert is marking the Lead object in the main table with CuriumConverted=TRUE. Next, assuming the convert operation is creating an opportunity, the Opportunity object is created with a tmpId and set with CuriumCreated=TRUE. Finally, a Createlist FIFO entry is enqueued with IsCreate=FALSE and the convertLead arguments stored in the new Createlist row, along with the opportunity tmpId.

At sync time, the Createlist is dequeued (with an IsCreate=FALSE item) and the Salesforce SOAP API convertLead is called to get a real Id. This real Id needs to be swapped for the tmpId in all places. Finally, the ServerWrittenThisSyncIteration property is set to indicate another iteration of the sync algorithm should take place. This will fetch back the fully formed entry just created on the server since the newly created server-side object's LastModified-Date will be later than the end window timestamp of the current sync iteration. We want the server's full copy because some fields may be calculated, and we don't want to reengineer that work on the client side.

QueryWave

Figure 11:
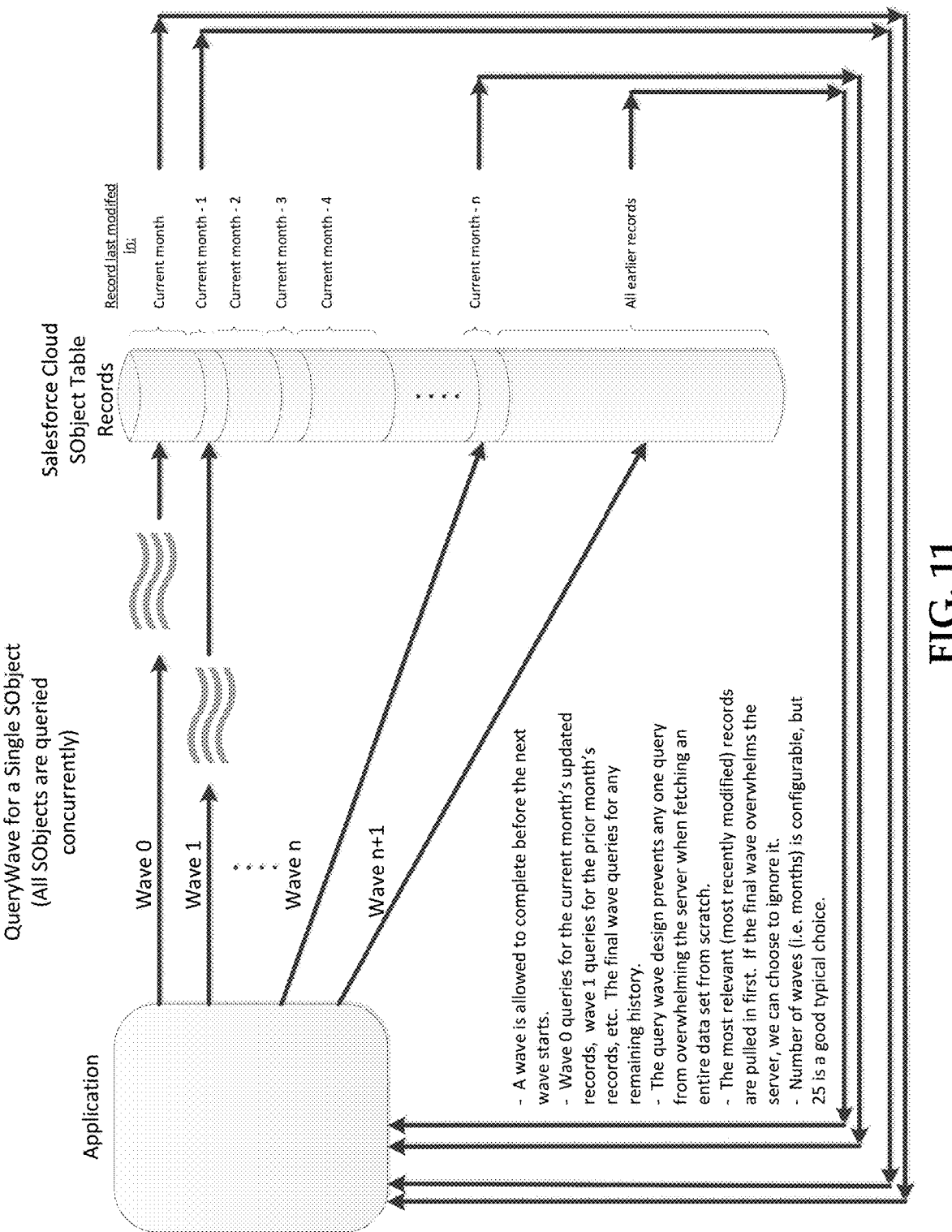
FIG. 11 illustrates an exemplary querywave method.

Referring now to FIG. 11, which illustrates a QueryWave technique for selecting and transferring objects from the Salesforce cloud server to the client. In this instance, the client sends a series of SOQL request "waves" to the server, reading the data a chunk at a time. Each wave request corresponds to one month's (or partial month's) worth of created/modified records. Limiting the amount of data in any one chunk reduces the likelihood the server will timeout in failure trying to build an enormous query response. All SObjects may be queried in parallel for best performance.

OnlineIndicator

Figure 12:
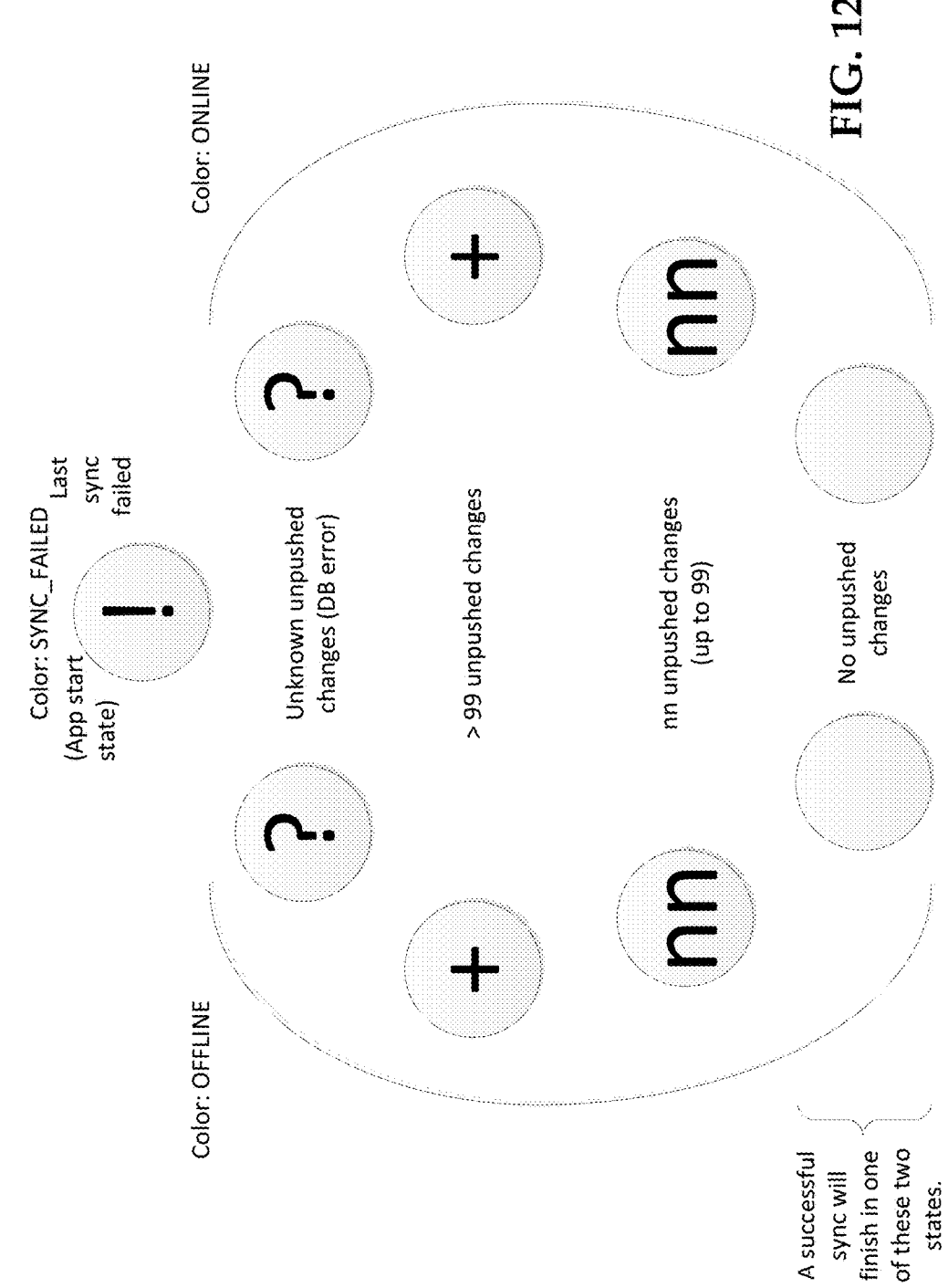
FIG. 12 illustrates an exemplary online indicator and user interface for use in accordance with the present technology.

FIG. 12 illustrates an OnlineIndicator, which is a novel UI component for simultaneously showing the sync status, online/offline status, and the number of local updates that need to be synced to the cloud server. The OnlineIndicator can also be pressed to bring up a short menu of actions available to the user regarding syncing and online/offline state.

Relationship Sync Embodiment

Figure 13:
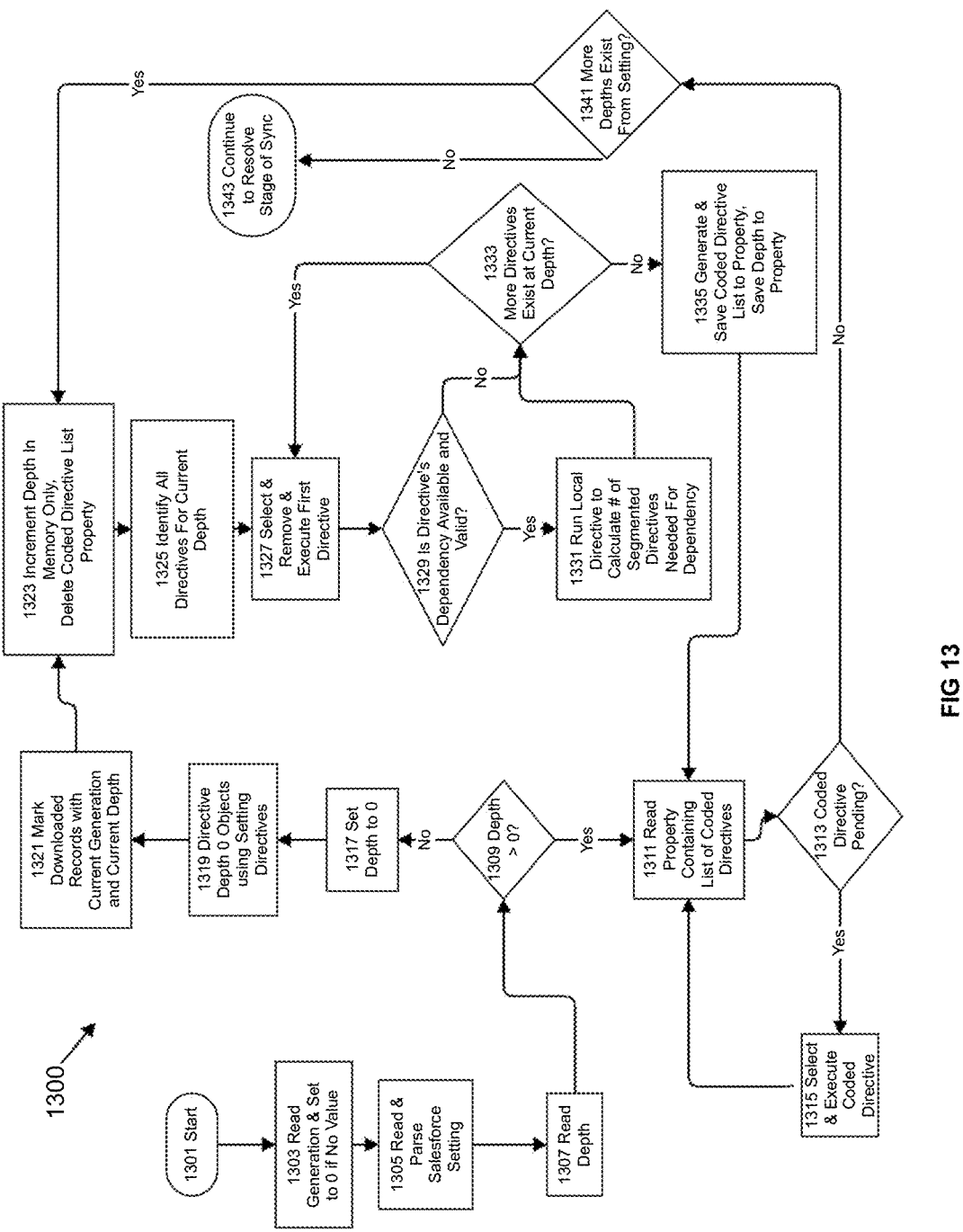
FIG. 13 is a flowchart of a preferred embodiment of a method for executing Synchronization ("Sync") Generations.

FIG. 13 is a flowchart 1300 of a preferred embodiment of a method for executing Sync Generations in a preferred embodiment which we can refer to as the Relationship Sync embodiment, which is a modification to what has been described above which we can refer to as the Standard Sync embodiment. In the following we use the term dependency to mean that a relationship exists between two objects and that once we have retrieved the records from one of those objects, we make use of that relationship to retrieve records from the other object. What this means in practice, is that we use data retrieved from Depth n as part of the constructed queries for Depth N+1. So, the N+1 constructed queries are dependent on the Depth n associated records.

Note that while below we primarily will be discussing the Relationship Sync embodiment, the invention does contemplate using elements of both embodiments (which we can refer to as a Hybrid sync embodiment). In such a Hybrid Sync we perform an initial Sync (the first Sync, Generation zero) using the Relationship Sync as described. However, in general all subsequent Sync Generations (catch-up Syncs) would use the Standard Sync, perhaps with some modifications.

Benefits of Hybrid Sync Embodiment

This can reduce the time it takes to run a catch-up sync. This is because while Relationship Sync works great at retrieving only relevant data, compared to the Standard Sync, it may require a higher minimum number of queries to be run to check for changes even when there may only be a few changed records to retrieve. For example, to check for new records or updates, we typically only need to run one query per object with Standard Sync while it may take tens to hundreds of queries per object using Relationship Sync.

Standard Sync Modifications

The downside of using the Standard Sync is that we may end up retrieving many records the user is not interested in (not in their defined object relationship hierarchy). The compromise is to first retrieve all changed records with the Standard Sync and then check those records against the user's existing data hierarchy. The way this works is that any records downloaded that are associated with Depth 0 are just accepted because there is no dependency at that Depth. However any records downloaded that are associated with Depth n (N>0), means that a dependent record (at Depth n−1) must already exist on the device, and if not, is considered extraneous and thus is deleted.

Also, to speed up the Standard Sync queries as much as possible we only query for the fields that are absolutely necessary to determine its status in the relationship hierarchy. Once we have all those records and have purged the extraneous records, we run another stage that then retrieves all the fields for those remaining records.

"Partial" Relationship Sync

After the modified standard catch-up queries have completed, we may detect records that are new. What we mean by new here is not that an existing local record has an update, but that a downloaded record did not previously exist on the local database. When we have new records at Depth N, this means that queries at Depth N+1 have new dependent records that may in turn return new records and so on. Because of this, we treat new records as if this is an initial Sync but for just those records. xxx In FIG. 13, 1301 represents the start of the process. In 1303 the generation number is read, or else set to 0. Next the application (typically a CRM such as Salesforce) Directive/setting is read 1305 and translated into the queries. Note that in the following when we discuss that Directives are read and executed, it is implicit that query translation is part of this process. Next the Depth is read 1307 or else set to 0. If 0, the queries corresponding the Depth 0 objects are run, and the corresponding application objects (typically database record or rows) are downloaded. The Depth is incremented 1323 in memory and the Directive list property is deleted. Next all the Directive/queries for the current Depth are identified 1325 and the first Directive is executed 1325. 1327 If the Directive does not have an existing and valid dependency, it is checked if there any more Directives are at the current Depth 1333. If yes, we loop back to 1327, if not, we generate and save the Directive list and Depth 1335. 1327 If the Directive does have an existing and valid dependency, that Directive is run locally to calculate the number of segmented Directives needed for the dependency 1331 and then the flowchart moves to 1333 as describe above.

If in 1333 there are no more Directives at the current Depth, we generate and save the Directive list (as well as the Depth), to the property table/object as described above, see FIG. 3, and move to 1311. Also, if in 1309 the Depth is read greater than 0, we also move to 1311, where we read the list of Directives from the property table. If there is a pending Directive 1313 we select and execute the Directive 1315 and loop back to 1311. If not, we check if there is an additional Depth 1341. If yes, we loop back to 1323, if not then the sync will be resolved 1343 as described above, see FIG. 5.

Figure 14:
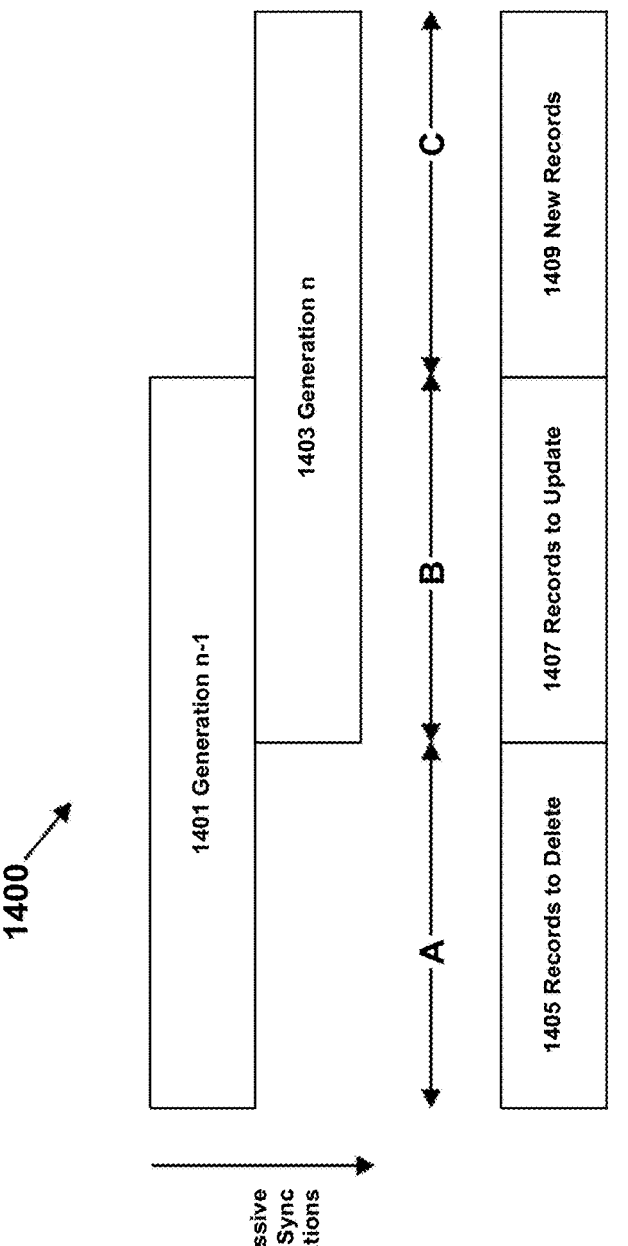
FIG. 14 is a schematic representation of Sync Generation relationships.

FIG. 14 is a schematic representation 1400 of the relationship between example Sync Generations. 1401 schematically represents Sync Generation n−1 and 1403 schematically represents Sync Generation n. When Sync Generation n occurs, there will be Salesforce object records (or some other kind of other records, rows, and data from an object, such as a SQL row) that, with respect to Sync Generation n−1 need to be deleted, ones that need to updated, and new records to insert. In the current Sync Generation is zero, then of course there will be no old records to address, as all the records will be new.

Figure 15:
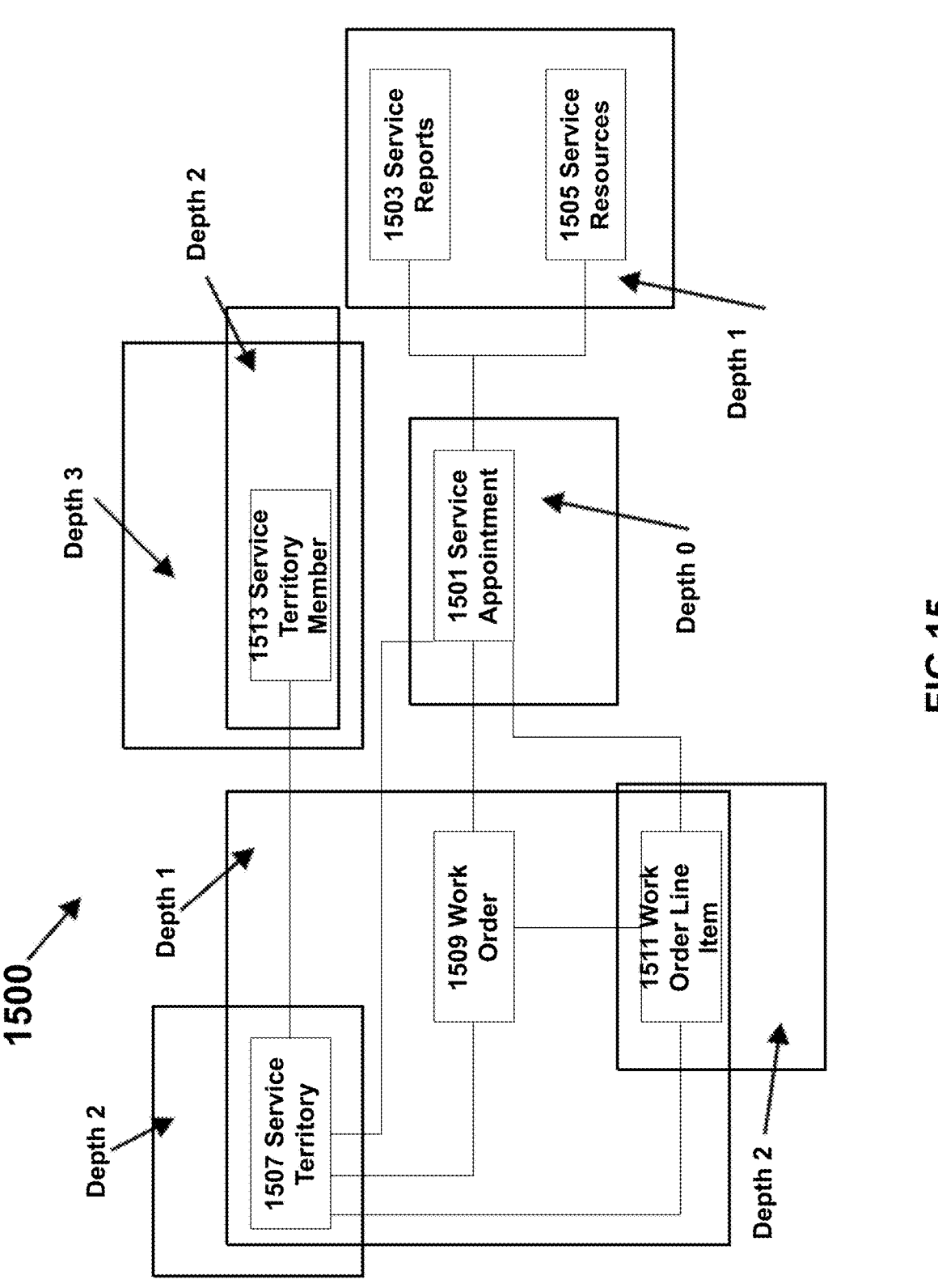
FIG. 15 is entity relationship diagram of software objects (tables) of a preferred embodiment.

FIG. 15 is an entity relationship diagram ("ERD") 1500 of example software objects (tables) of a preferred embodiment. We see Depth 0 object(s), Service Appointment(s) 1501. This and the other objects in this figure are Salesforce objects (essentially database tables). There are Service Report(s) 1503 and Services Resource(s) 1505 that depend from the Service Appointment(s) 1501. Both are Depth 1 objects as shown. Service Territory(s) 1507, Work Order(s) 1509, and Work Order Line Item(s) 1511 are also Depth 1 objects. Work Order Line Item(s) 1511 is also a Depth 2 object. The Service Appointment(s) 1501 depends on Work Order(s) 1509 and Work Order Line Item(s) 1511. Work Order(s) 1509 and Work Order Line Item(s) 1511 depend on Work Order(s) and Service Territory(s) 1507. Also shown is Service Territory Member 1513 which is a Depth 2 and Depth 3 object, and depends on and Service Territory(s) 1507.

Directives (Settings)

"Directives" herein mean user-friendly and software parseable instructions (typically generated by a user such as an administrator) on how to retrieve one or more records from the server to store on the local device. With Directives, such a user can specify records to retrieve by identifying how different objects relate to each other. The algorithm of the invention translates such Directives into queries for the server. The Directives are typically specific by an admin/user in the CRM application settings.

The following is an overview of Directive construction, query translation, and query use. The invention includes a method of describing components of a non-dependent database query as delimited text ("Directive"), the consisting of these components:_Depth: A number representing the query's Depth where Depth is 0;_Target: The name of the object to query;_Criteria: [optional] Any criteria to use in filtering the query;_SyncWindow: [optional] A flag that controls the use of additional filter criteria.

A method of describing components of a dependent database query as a delimited text or "Directive", the method including Depth: A number representing the query's Depth where Depth is greater than 0; Target: The name of the object to query; TargetProperty: The name of a property that exists in Target; DependentObject: The name of the dependent object; DependentProperty: The name of a property that exists in DependentObject; Criteria: [optional] Any criteria to use in filtering the query; SyncWindow: [optional] A flag that controls the use of additional filter criteria.

In the above methods the Depth n (n>0) can be a name that is defined by another Directive in either claim 1 (b) or claim 2 (b) from Depth n−1, each Directive can specify a relationship between two software objects such that (b) and (d) can be associated via their respective properties (c) and (e), a Directive relationship from any prior Depth can exist.

The method includes describing one or more Directives or zero or more Directives of claim 2 as a synchronization ("Sync") plan, where at least one Directive must exist, and methods where this is a dependent Directive.

The method includes synchronizing includes a local client application with a server application, manually creating and using a Sync Plan as input; translating all Depth 0 Directives from (a) into database queries; executing (b) queries on the server and storing the records on the client; translating all Depth 1 Directives from (a) into database queries; executing (d) queries on the server and storing the records on the client; repeating (d) and (e) for each sequential Depth until no Directives found for a particular Depth.

The methods may include running multiple subsequent times to download additional sets of records to maintain the synchronization of the local client application with the server application over time. The method may include wherein the one or more Directives in (a) and (b) in the Sync Plan are created by an application or database administrator ahead of time and provided as an input string to the local application via electronic means such as with a download of configuration settings from the server. The queries may be in SOQL (Salesforce database query language) syntax or other database syntax. The client records may be SQL database records among other records or objects. The methods may include the relationship described is between two software objects, the objects being Salesforce objects. The method may include wherein the relationship described is between two software objects, the objects being SQL or other SQL-similar tables.

As a detailed embodiment, consider the example Salesforce application setting(s) (Directives) named: pulsar.sync.relationship.directives 1st Depth delimiter | separates distinct query Directives 2nd Depth delimiter ; separates a Directives components 3rd Depth delimiter : separates components into subcomponents Starting objects:

0;<object type that we're syncing>;<optional SOQL where clause>; <optional sync window usage (default YES)>

All other Directives (for lookups and children):

<Depth other than 0>;<object type that we're syncing>:<optional id field name (default Id)>;<source object type from previous Depth>:<optional id field name (default Id)>;<optional SOQL where clause>;<optional sync window usage (default YES)>

The setting (Directive) can be uploaded by a user from a spreadsheet, for example:

0;ServiceAppointment;

Id IN (Select ServiceAppointmentId from AssignedResource WHERE ServiceResource.RelatedRecordId=@@@CurrentUser.Id) AND SchedStartTime<=NEXT_N_DAYS:45 AND SchedEndTime>=LAST_N_DAYS:45 AND Status NOT IN ('New', 'Scheduled', 'Canceled');NoSyncWindow

|

0;Account;

Primary_Address_Country_c='@@@CurrentUser.Country'

|

0;Lead;Lead.OwnerId='@@@CurrentUserId'

|

0;Case;OwnerId='@@@CurrentUserId'

|

0;AppExtension

|

0;FieldServiceMobileSettings

|

0;MobileSettingsAssignment

|

0;Organization

|

0;Product2;CID_c!='' and CID_c!=null

|

0;WorkOrderStatus

|

0;WorkOrderLineItemStatus

|

0;ServiceResource;RelatedRecordId=@@@CurrentUser.Id

|

1;AssignedResource:ServiceAppointmentId;ServiceAppointment

|

1;WorkOrder:X means ID is in parent;ServiceAppointment:ParentRecordId

|

1;WorkOrderLineItem;ServiceAppointment:ParentRecordId

|

1;Account;ServiceAppointment:ParentRecordId

|

1;Account;ServiceAppointment:AccountId

|

1;ServiceTerritoryMember:ServiceResourceId;ServiceResource

|

2;Asset;WorkOrder:AssetId

|

2;Asset;WorkOrderLineItem:AssetId

|

2;ServiceResource;AssignedResource:ServiceResourceId

|

2;Location;WorkOrder:LocationId

|

2;Location;WorkOrderLineItem:LocationId

|

2;WorkOrderLineItem:WorkOrderId;WorkOrder

|

2;Account;WorkOrder:AccountId

|

2;ServiceTerritory;ServiceTerritoryMember:ServiceTerritoryId

|

3;Contact;AccountId:Account;AllDepthsPrior

|

3;Location:RootLocationId;Location:RootLocationId

|

3;Product2;Asset:Product2Id

|

3;ServiceTerritoryLocation:ServiceTerritoryId;ServiceTerritory

|

4;Location;ServiceTerritoryLocation:LocationId

|

5;ProductItem:LocationId;Location

Example of Synchronizing the Mobile App with the Server using Directives

In a preferred embodiment, we let the user specify an object list representing the objects to iterate through using a relationship style Sync. The object list format allows the user to specify which parent and child relationships for a particular object type should be synced. The user needs to specify the root object type or starting point.

We designate a starting or root object type as Depth 0. Depth n corresponds to objects at n number of relationships from the root object. Implementation-wise, there typically we be these fields added to every table:

A SYNC_GENERATION field representing the Sync Generation number that the record was last updated with (initial sync is 0)

A RELATIONSHIP_DEPTH field representing the number of relationships from the root object (root object is 0, and parents and children are 1)

This fields coordinate relationship queries between Depths. Starting from a root object (Depth 0), we sync that object type based on criteria until complete. We then iterate through the parent and child relationships per the setting's Directives, but only if the particular relationship has been requested AND that object type representing that relationship exists in the list. We iterate through all the Depth 1 relationships and only move on to Depth 2 for a Depth 1 object if that object has completed its sync in Depth 1

Sync Embodiment

Starting from the root object, the plan is to sync all we need of this object type (using the sync filter) before proceeding further.

First sync: All the initial object records would get assigned a '0' sync generation.

N syncs after first sync: All the downloaded records (even if they already exist locally) get assigned 'N' Sync Generation This implies the following potential state:

1. there could be records that exist locally that were not downloaded and replaced (potentially stale)
2. there could be the records that get replaced/refreshed
3. there could be records that are downloaded for the first time and are new to the local database For #1, we the invention can opt to remove these local records or keep them and shunt the responsibility for hiding or updating them from the UI. For #2 and #3, the algorithm can distinguish between these so that we process their child relationships differently.

Alternative Sync Embodiment

1. First check for self-referencing parent relationships and calculate which ids are missing as some may already be synced in Phase 1A.
2. Download all missing root records that we know about.
3. Repeat steps 1 and 2 until there are no missing ids Assume we've synced the root object completely. We now start to process the root's normal parent relationships.

First sync: All the root's parent fields are synced using as few queries as possible by combining identical object type references into one query. We issue these queries and filter them:

1. by their respective user-defined sync filters, and
2. by all the root object's Ids from the current generation At a minimum, all Directives typically specify a Depth number and the name of the object we wish to sync. Starting with Directives of Depth n (where n>=0), we must retrieve all of the objects/records corresponding to Depth n before moving to the N+1 Directives. This is because the Depth n objects have an implicit dependency on objects already retrieved at Depth n−1. So, this means that all objects at Depth n (where n>0) must have a single relationship connecting it to an object retrieved from the prior Depth.

Consider a schematic example, where the goal is to sync Object A and Object B, where A is the parent of B. As a child object, B typically contains a field that references a parent object to establish the relationship. This parent field might be empty or contain a reference to a record from Object A. Because there is a direct relationship between these two objects, the client can specify multiple ways of retrieving data from both objects. These are typically options:

Option 1: Retrieve records from Object A first (Depth N), then retrieve records from Object B (Depth N+1) where B's parent field matches a record retrieved from A at Depth N.

Option 2: Retrieve records from Object B first (Depth N), then retrieve records from Object A (Depth N+1) where A's record matches the value from B's parent field at Depth N.

Option 3: Retrieve records from both objects at the same Depth (Depth N) ignoring any restrictions on how they are related.

These options will often return different results depending on how prior Depths are filtered. Because of this, each client creates their own Directives as per their specific data structure and synchronization needs. These Directives are input into our algorithm and only data specified by the Directives are ultimately retrieved. Every Directive is converted into an implementation specific query that the server understands.

In a preferred embodiment, each Directive (where n>0) contains:

Depth: the Depth number n (where n>0);

Target: the object we would like to retrieve records from

Field: the field name in the Target that is used to relate to the dependent object;

DependentObject: the object that the target object is required to be filtered with;

DependentField: the field in the DependentObject that is used to relate to the target object;

There are optional additional criteria, such aa a 'WHERE' clause fragment (without the 'WHERE' keyword) of a complete query in typical implementations. Such a criterion must be specific such that the syntax here needs to be understood by the server.

A way for a user to read/understand understand the relationship defined in a Directive is:

"Return all records from {Target} object where its {Field} field has a match in this list:

(Return a list of all values from the {DependentField} field of the {DependentObject} object only where the dependent record's Depth is {n−1})".

"Subsequently the {Target} records returned are tagged at Depth {Depth}".

The dependency of the relationship in a typical embodiment is retrieved at Depth n−1. That being said, although we currently use the immediately preceding Depth as the implied Depth, there is no technical reason that the relationship Depth cannot be any prior Depth as long as that dependent Directive exists at that Depth D (where $0<=Depth<n$).

The Directive to query algorithm translation begins by parsing all the Directives and validating whether the Directives are internally consistent. This means that there cannot be any dependent references to Directives that do not exist in the full Directive list. Then starting from Depth 0's Directives, we convert each Directive into a query. This conversion is simpler with Directives at Depth 0 compared with those at Depths>0. At Depth 0, there are no dependencies, so we construct the query solely from the components of the parsed Directive:

Example of Depth 0 example query construction (without sync window):

Directive without optional criteria:

0;[Target];;NoSyncWindow

Directive with additional criteria:

0;[Target];[additional criteria];NoSyncWindow

Generated Query:

SELECT {field list} FROM {Target}

[WHERE {additional criteria}]

Note that {field list} is obtained via a separate schema call and is not part of the Directive syntax. All available fields are requested by default. Also, if the 'NoSyncWindow' option is specified, then we do not include sync window criteria automatically.

Typical a 'sync window' date range is appended if the Directive did not elect to omit it.

Depth 0 example query construction (with sync window):

Directive without optional criteria:

0;[Target]

Directive with criteria:

0;[Target]; [additional criteria]

Generated Query:

SELECT {field list} FROM {Target}

WHERE {date field}>{start date}

AND {date field}<={end date}

[AND {additional criteria}]

Note that the sync window related information ({date field}, {start date}, and {end date}) are all derived and managed separately so are not part of the Directive syntax.

With Depths>0, the query construction becomes more involved. The Directive syntax changes to this format:

{Depth};{Target}:{Field};{DependentObject}:{DependentField}; [{AdditionalCriteria}]

Note, the 'NoSyncWindow' option is also supported here, but is not shown below.

As you can see, with these Depths, dependencies are required, and our algorithm first resolves each dependency into a distinct list of literal field values.

In order to do this, we must query our local data store for the {DependentObject} and {DependentField} at the correct Depth. To determine the correct Depth, we make use of a special numeric field (DepthHistory) that we added to all local objects (only). The way this single numeric field tracks multiple Depths is because we treat this number as a bit vector where each bit represents a Depth. This allows us to tag any single record with one or more associated Depths.

Regarding the bit vector, starting from the right-most position in binary notation, we associate a Depth to each position starting with Depth 0. So, consider the following Depth to binary notation association:

| Depth | Binary Notation | Decimal Value |
|---|---|---|
| 0 | 0001 | 1 |
| 1 | 0010 | 2 |
| 2 | 0100 | 4 |
| 3 | 1000 | 8 |

This allows us to tag more than one Depth as follows:

| Depth(s) | Binary Notation | Decimal Value |
|---|---|---|
| 0, 1 | 0011 | 3 |
| 0, 2 | 0101 | 5 |
| 1, 2 | 0110 | 6 |
| 1, 2, 3 | 1110 | 14 |

So, considering the above, this means that every time we retrieve records, we are tagging the downloaded record with the Depth it was downloaded from. If the algorithm determines that the record would be queried for again but this time at a different Depth, we update the Depth history to include this additional Depth information.

An example Directive at Depth 1 (with the optional additional criteria):

1;{Target}:{Field};{DependentObject}:{DependentField};{AdditionalCriteria}

Knowing the dependent object, dependent field, and Depth, we can query our local data store for a list of field values. For this query, we first need to adjust the Depth as follows:

DependentDepth=Depth−1=1−1=0

Now we need to convert this decimal value into our bit vector format. From the table above, a Depth of '0' is given a value of 1.

DependentDepth (0)=>DependentDepthAsBitValue (1)

The final query to retrieve the dependent values would be of a form like this (using bitwise logic to filter for the desired Depth):

16

SELECT {DependentField} FROM {DependentObject} WHERE DepthHistory {DependentDepthAsBitValue}=={DependentDepthAsBitValue}

Our algorithm takes the result of this dependent query and constructs a delimited string to be used in the final query as below. An example of the dependent query results would be: ('ST-001', 'ST-002', 'ST-003', . . . )

Once the dependencies are resolved into a literal delimited list of values, this is used to form the main part of the query.

Depth n (where n>0) query construction (with sync window):

SELECT {field list} FROM {Target}

WHERE {date field}>{start date}

AND {date field}<={end date}

AND {field} IN ({delimited list of DependentField values from DependentObject})

Additional Notes on the DepthHistory Field:

Besides being used for retrieving field values from dependencies, this Depth history is critical for knowing when to safely purge a record. For example, if a record was deleted on the server, we pick up that deletion and subsequently remove it from our local data store. If that record was part of a relationship chain that had dependencies, it is possible that records at higher Depths that depended on that record also need to be removed. However, because a record can be associated with multiple Depths, we do not want to remove records that continue to have a valid relationship chain. We therefore validate the entire relationship hierarchy, updating the Depth history where appropriate to remove Depth(s) that are no longer valid. At the end of this validation, we can then examine the final value of the Depth history field to conclude whether records can be safely removed.

Also, our use of a special DepthHistory field is implementation specific. The important concept here is to have a way to track multiple Depths per local record. For example, another way we could have implemented this is via a helper table for each object. That table could have two fields, one field linking back to the main table record, and the second field representing the Depth.

Example Directive and Translation to Query

Directive:

0;ServiceAppointment;

UserId='U-001' AND

SchedStartTime<=NEXT_N_DAYS:45 AND

SchedEndTime>=LAST_N_DAYS:45 AND

Status NOT IN ('New', 'Scheduled', 'Canceled'); NoSyncWindow

|

1;ServiceReport:ParentId;ServiceAppointment:Id

|

1;ServiceResource:ServiceAppointmentId;ServiceAppointment:Id

|

1;ServiceTerritory:Id;ServiceAppointment:ServiceTerritoryId

|

1;WorkOrder:Id;ServiceAppointment:ParentRecordId

|

1;WorkOrderLineItem:Id;ServiceAppointment:ParentRecordId

|

2;WorkOrderLineItem:WorkOrderId;WorkOrder:Id

|

2;ServiceTerritoryMember:ServiceTerritoryId;ServiceTerritory:Id

|

2;ServiceTerritory:Id;WorkOrder:ServiceTerritoryId

|

3;ServiceTerritoryMember:ServiceTerritoryId;ServiceTerritory:Id

Generated Queries and Each Corresponding Directives:

(a)

Directive:

0;ServiceAppointment;

UserId='U-001' AND

SchedStartTime<=NEXT_N_DAYS:45 AND

SchedEndTime>=LAST_N_DAYS:45 AND

Status NOT IN ('New', 'Scheduled', 'Canceled'); NoSyncWindow

Query:

SELECT Id,Name, . . . FROM ServiceAppointment WHERE UserId='U-001' AND

SchedStartTime<=NEXT_N_DAYS:45 AND

SchedEndTime>=LAST_N_DAYS:45 AND

Status NOT IN ('New', 'Scheduled', 'Canceled')

==>Returns 3 ServiceAppointment records containing field values for fields (Id, ServiceTerritoryId, ParentRecordId):

==>Record 1 (SA-001, ST-001, WO-001)

==>Record 2 (SA-002, ST-001, WO-002)

==>Record 3 (SA-003, ST-002, WOLI-001)

(b)

Directive:

1;ServiceReport:ParentId;ServiceAppointment:Id

Query:

SELECT Id,Name, . . . FROM ServiceReport WHERE ParentId IN ('SA-001', 'SA-002', 'SA-003')

AND (LastModifiedDate>2021-12-23T13:32:49.182Z)

AND (LastModifiedDate<=2022-01-05T14:28:16.961Z)

(c)

Directive:

1;ServiceResource:ServiceAppointmentId;ServiceAppointment:Id

Query:

SELECT Id,Name, . . . FROM ServiceResource WHERE ServiceAppointmentId IN ('SA-001', 'SA-002', 'SA-003')

AND (LastModifiedDate>2021-12-23T13:32:49.182Z)

AND (LastModifiedDate<=2022-01-05T14:28:16.961Z)

(d)

Directive:

1;ServiceTerritory:Id;ServiceAppointment:ServiceTerritoryId

Query:

SELECT Id,Name, . . . FROM ServiceTerritory WHERE Id IN ('ST-001', 'ST-002')

AND (LastModifiedDate>2021-12-23T13:32:49.182Z)

AND (LastModifiedDate<=2022-01-05T14:28:16.961Z)

==>Returns 2 ServiceTerritory records:

==>Record 1 (ST-001)

==>Record 2 (ST-002)

(e)

Directive:

1;WorkOrder:Id;ServiceAppointment:ParentRecordId

Query:

SELECT Id,Name, . . . FROM WorkOrder WHERE Id IN ('WO-001', 'WO-002')

AND (LastModifiedDate>2021-12-23T13:32:49.182Z)

AND (LastModifiedDate<=2022-01-05T14:28:16.961Z)

==>Returns 2 WorkOrder records containing field values for fields (Id, ServiceTerritoryId):

==>Record 1 (WO-001, ST-002)

==>Record 2 (WO-002, ST-003)

(f)

Directive:

1;WorkOrderLineItem:Id;ServiceAppointment:ParentRecordId

Query:

SELECT Id,Name, . . . FROM WorkOrderLineItem WHERE Id IN ('WOLI-001')

AND (LastModifiedDate>2021-12-23T13:32:49.182Z)

AND (LastModifiedDate<=2022-01-05T14:28:16.961Z)

(g)

Directive:

2;WorkOrderLineItem:WorkOrderId;WorkOrder:Id

Query:

SELECT Id,Name, . . . FROM WorkOrderLineItem WHERE WorkOrderId IN ('WO-001', 'WO-002')

AND (LastModifiedDate>2021-12-23T13:32:49.182Z)

AND (LastModifiedDate<=2022-01-05T14:28:16.961Z)

(h)

Directive:

2;ServiceTerritoryMember:ServiceTerritoryId;ServiceTerritory:Id

Query:

SELECT Id,Name, . . . FROM ServiceTerritoryMember WHERE ServiceTerritoryId IN ('ST-001', 'ST-002')

AND (LastModifiedDate>2021-12-23T13:32:49.182Z)

AND (LastModifiedDate<=2022-01-05T14:28:16.961Z)

==>Returns 4 ServiceTerritoryMember records containing field values for fields (Id, ServiceTerritoryId):

==>Record 1 (STM-001, ST-001)

==>Record 2 (STM-002, ST-001)

==>Record 3 (STM-003, ST-002)

==>Record 4 (STM-004, ST-002)

(i)

Directive:

2;ServiceTerritory:Id;WorkOrder:ServiceTerritoryId

Query:

SELECT Id,Name, . . . FROM ServiceTerritory WHERE Id IN ('ST-002', 'ST-003')

AND (LastModifiedDate>2021-12-23T13:32:49.182Z)

AND (LastModifiedDate<=2022-01-05T14:28:16.961Z)

==>Returns 2 ServiceTerritory records:

==>Record 1 (ST-002)

==>Record 2 (ST-003)

(j)

Directive:

3;ServiceTerritoryMember: ServiceTerritoryId;ServiceTerritory:Id

Query:

SELECT Id,Name, . . . FROM ServiceTerritoryMember WHERE ServiceTerritoryId IN ('ST-002', 'ST-003')

AND (LastModifiedDate>2021-12-23T13:32:49.182Z)

AND (LastModifiedDate<=2022-01-05T14:28:16.961Z)

==>Returns 5 ServiceTerritoryMember records containing field values for fields (Id, ServiceTerritoryId):

==>Record 1 (STM-003, ST-002)

==>Record 2 (STM-004, ST-002)

==>Record 3 (STM-005, ST-003)

==>Record 4 (STM-006, ST-003)

==>Record 5 (STM-007, ST-003)

Note that while the invention discusses database applications and downloading (including updating) records from the server version to the local version (wherein the software objects are database tables) such as Salesforce CRM, the invention also contemplates and is applicable to essentially any other software application with objects. We can generically think of data to be downloaded to the local client (whether new to the local client or to be "updated") as any "specified data" from any software object, of which again database table objects and their corresponding records or rows are but one example. Additional examples including methods and variables associated with software objects.

Figure 16:
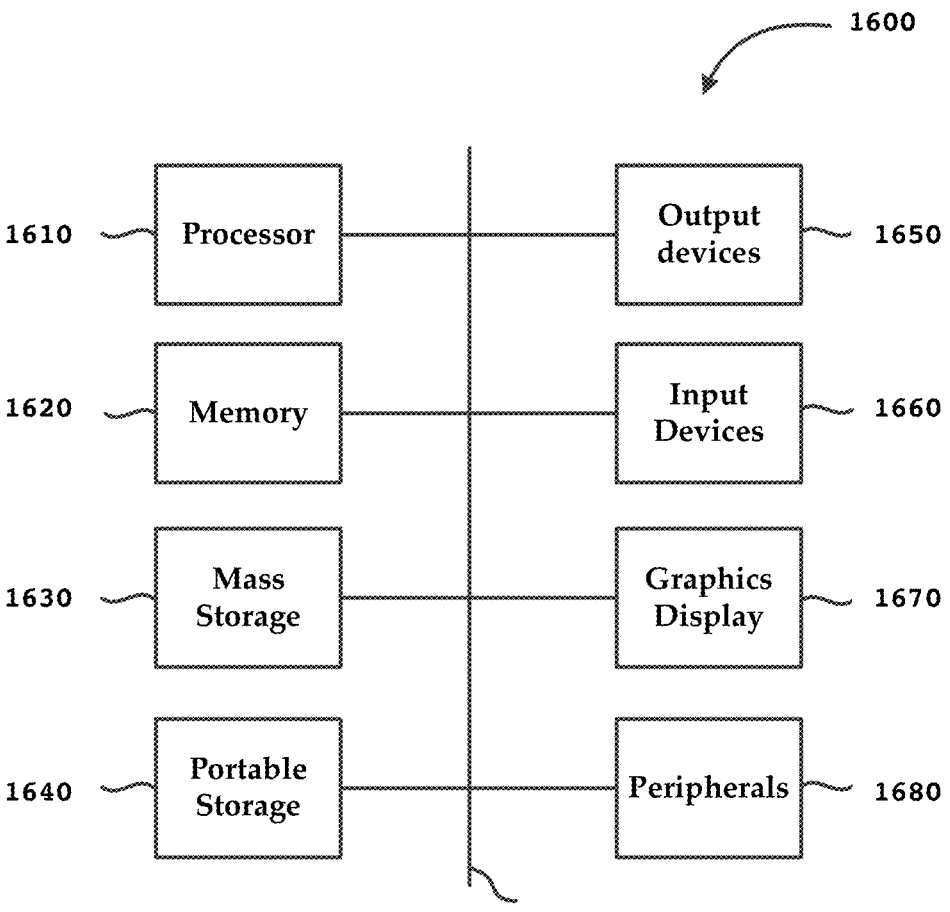
FIG. 16 is a block diagram of an exemplary computing system for implementing embodiments of the present technology.

FIG. 16 illustrates an exemplary computing system 1600 that may be used to implement an embodiment of the present technology. The system 1600 of FIG. 16 may be implemented in the contexts of the likes of computing systems, networks, servers, or combinations thereof. The computing system 1600 of FIG. 16 includes one or more processors 1610 and main memory 1620. Main memory 1620 stores, in part, instructions and data for execution by processor 1610. Main memory 1620 may store the executable code when in operation. The system 1600 of FIG. 16 further includes a mass storage device 1630, portable storage medium drive(s) 1640, output devices 1650, user input devices 1660, a graphics display 1670, and peripheral device(s) 1680.

The components shown in FIG. 16 are depicted as being connected via a single bus 1690. The components may be connected through one or more data transport means. Processor unit 1610 and main memory 1620 may be connected via a local microprocessor bus, and the mass storage device 1630, peripheral device(s) 1680, portable storage device 1640, and graphics display 1670 may be connected via one or more input/output (I/O) buses.

Mass storage device 1630, which may be implemented with a magnetic disk drive or an optical disk drive, is a non-volatile storage device for storing data and instructions for use by processor unit 1610. Mass storage device 1630 may store the system software for implementing embodiments of the present invention for purposes of loading that software into main memory 1620.

Portable storage medium drive(s) 1640 operates in conjunction with a portable non-volatile storage medium, such as a floppy disk, compact disk, digital video disc, or USB storage device, to input and output data and code to and from the computer system 1600 of FIG. 16. The system software for implementing embodiments of the present invention may be stored on such a portable medium and input to the computer system 1600 via the portable storage medium drive(s) 1640.

Input devices 1660 provide a portion of a user interface. Input devices 1660 may include an alphanumeric keypad, such as a keyboard, for inputting alpha-numeric and other information, or a pointing device, such as a mouse, a trackball, stylus, or cursor direction keys. Additionally, the system 1600 as shown in FIG. 16 includes output devices 1650. Suitable output devices include speakers, printers, network interfaces, and monitors.

Graphics display 1670 may include a liquid crystal display (LCD) or other suitable display device. Graphics display 1670 receives textual and graphical information and then processes the information for output to the display device.

Peripheral device(s) 1680 may include any type of computer support device to add additional functionality to the computer system. Peripheral device(s) 1680 may include a modem or a router.

The components provided in the computer system 1600 of FIG. 16 are those typically found in computer systems that may be suitable for use with embodiments of the present invention and are intended to represent a broad category of such computer components that are well known in the art. Thus, the computer system 1600 of FIG. 16 may be a personal computer, hand held computing system, telephone, mobile computing system, workstation, server, minicomputer, mainframe computer, or any other computing system.

The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEP-ROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method of synchronizing a local client application with its corresponding server application version, the method comprising:

the local client application receiving, via a means for receiving user input, at least one application setting, the application setting determining when to carry out the remainder of the method, the remainder of the method comprising:

the local client application receiving a set of directives comprising depth 0 directives and depth 1 directives over a network; translating each depth 0 directive and each depth 1 directive into a server executable query, each depth 0 directive comprising instructions for retrieving one or more database records and each depth 1 directive comprising instructions for retrieving one or more database records, wherein each record associated with each depth 1 directive is checked to see if it has a dependent record associated with a depth 0 directive, and if not, the record is excluded from the server executable queries and the directive is run only locally to calculate a number of segmented directives;

the local client application sending the queries corresponding to each depth 0 directive and each depth 1 directive to the server application, in order to download specified data from the server application corresponding to one or more software objects comprising database records from the server application to the local client application; and downloading the specified data from the server application corresponding to the one or more software objects comprising database records from the server application to the local client application, the client application downloading the specified data from the server application and its associated database, using SQL communication, queries, and protocols.

2. The method of claim 1 wherein the means for receiving user input is a mobile device.

3. The method of claim 1 wherein the means for receiving user input is a personal computer comprising a keyboard.

4. The method of claim 1 wherein the set of directives further comprises depth 2 directives, each depth 2 directive comprising instructions for retrieving one or more database records the method further comprising:

translating each depth 2 directive into a server-executable query; and sending the queries corresponding to each depth 2 directive to the server application, in order to download specified data from the server application corresponding to one or more software objects from the server application to the local client application.

5. The method of claim 1 wherein the specified data are SQL database records.

6. The method of claim 1 wherein the one or more software objects are Salesforce software objects.

7. The method of claim 1 wherein the method comprises a sync generation 0 wherein each database record is new to the local client application.

8. The method of claim 1 wherein the method comprises a sync generation number greater than 0, wherein at least one of the database records is to be updated.

9. The method of claim 1 wherein the method further comprises sending queries delimited by a sync window parameter that comprises a time stamp regarding a sync generation number n-1, the parameter limiting the application objects to be downloaded to objects that were modified or created after the time stamp.

10. The method of claim 1 further comprising, sending the queries corresponding to the depth 0 directive a second time and sending the queries corresponding to the depth 1 directive a second time, as part of a sync generation n greater than 0.

11. The method of claim 1 further comprising wherein at least one of the depth 1 directives comprises a dependent object and a dependent property, wherein the dependent property describes the relationship between the dependent object and another object.

12. A method of synchronizing a local client application with its corresponding server application version, the method comprising:

the server application receiving, via a network and a means for receiving user input, at least one application setting, the application setting determining when to carry out the remainder of the method, the remainder of the method comprising:

the server application receiving a set of server executable queries previously translated from one or more depth 0 or depth 1 directives, in order to download specified data from the server application corresponding to one or more software objects; and receiving the queries corresponding to the depth 0 directives a second time; and receiving the queries corresponding to each depth 1 directive a second time;

wherein each record associated with each depth 1 directive was checked to see if it has a dependent record associated with a depth 0 directive, and if not, the record was excluded from the server executable queries and the directive is run only locally to calculate a number of segmented directives; and downloading the specified data from the server application corresponding to the one or more software objects comprising database records from the server application to the local client application, the client application downloading the specified data from the server application and its associated database, using SQL communication, queries, and protocols.

13. The method of claim 12 wherein the means for receiving user input is a mobile device.

14. The method of claim 12 wherein the means for receiving user input is a personal computer comprising a keyboard.

15. The method of claim 12 wherein the set of directives further comprises depth 2 directives over a network comprising the Internet, the method further comprising: translating each depth 2 directive into a server-executable query; and sending the queries corresponding to each depth 2 directive to the server application in order to download specified data from the server application corresponding to one or more software objects from the server application to the local client application.

16. The method of claim 12 wherein the specified data are SQL database records.

17. The method of claim 12 wherein the method further comprises sending queries from the local client application to the server, over a network comprising the Internet, delimited by a sync window parameter that comprises a time stamp regarding a sync generation number n-1, from the local client over a network comprising the Internet, the parameter limiting the application objects to be downloaded to objects that were modified or created after the time stamp.

18. The method of claim 12 further comprising wherein at least one of the depth 1 directives comprises a dependent object and a dependent property, wherein the dependent property describes the relationship between the dependent object and another object.

19. A method of synchronizing a local client application with its corresponding server application version, the method comprising:

receiving, via a network and a means for receiving user input, at least one application setting, the application setting determining when to carry out the remainder of the method, the remainder of the method comprising:

receiving a set of directives comprising depth 0 directives from a server application over a network comprising the Internet;

translating each depth 0 directive into a server-executable query, wherein each record associated with each depth 1 directive is checked to see if it has a dependent record associated a depth 0 directive, and if not, the record is excluded from the server executable queries and the directive is run locally to calculate a number of segmented directives;

sending the server executable queries corresponding to each depth 0 directive to the server application in order to download specified data from the server application corresponding to one or more software objects comprising one or more database records from the server application to the local client application; and sending the specified data over a network comprising the Internet, the server application downloading the specified data from the server application and its associated database, using SQL communication, queries, and protocols.

20. The method of claim 19 wherein the means for receiving user input is a mobile device.

* * * * *